United States Patent
Berneth et al.

(10) Patent No.: US 6,926,943 B2
(45) Date of Patent: Aug. 9, 2005

(54) USE OF LIGHT-ABSORBING COMPOUNDS IN THE INFORMATION LAYER OF OPTICAL DATA CARRIERS, AND OPTICAL DATA CARRIERS

(75) Inventors: Horst Berneth, Leverkusen (DE); Friedrich-Karl Bruder, Krefeld (DE); Karin Hassenrück, Düsseldorf (DE)

(73) Assignee: Bayer Aktiengesellschaft, Leverkusen (DE)

( * ) Notice: Subject to any disclaimer, the term of this patent is extended or adjusted under 35 U.S.C. 154(b) by 83 days.

(21) Appl. No.: 10/240,566

(22) PCT Filed: Mar. 23, 2001

(86) PCT No.: PCT/EP01/03334

§ 371 (c)(1),
(2), (4) Date: Oct. 2, 2002

(87) PCT Pub. No.: WO01/75873

PCT Pub. Date: Oct. 11, 2001

(65) Prior Publication Data

US 2003/0175616 A1 Sep. 18, 2003

(51) Int. Cl.$^7$ ............................................. B32B 3/02
(52) U.S. Cl. .................. 428/64.1; 428/64.8; 430/270.14
(58) Field of Search ............................... 428/64.1, 64.4, 428/64.8, 913; 430/270.14, 495.1, 945

(56) References Cited

U.S. PATENT DOCUMENTS

| | | | | |
|---|---|---|---|---|
| 5,316,899 | A | | 5/1994 | Miyadera et al. ............ 430/495 |
| 5,871,882 | A | | 2/1999 | Schmidhalter et al. . 430/270.16 |
| 2002/0155381 | A1 | * | 10/2002 | Berneth et al. ......... 430/270.15 |
| 2003/0003396 | A1 | * | 1/2003 | Berneth et al. ......... 430/270.18 |
| 2003/0008234 | A1 | * | 1/2003 | Berneth et al. .......... 430/270.2 |

FOREIGN PATENT DOCUMENTS

| | | |
|---|---|---|
| JP | 6-295469 | 10/1994 |
| JP | 6-336086 | 12/1994 |
| JP | 7-304257 | 11/1995 |
| JP | 2557335 | 11/1996 |
| JP | 10-58828 | 3/1998 |
| JP | 10-181206 | 7/1998 |
| JP | 11-43481 | 2/1999 |
| JP | 2865955 | 3/1999 |
| JP | 11-110815 | 4/1999 |
| JP | 11-334204 | 12/1999 |
| JP | 11-334207 | 12/1999 |

OTHER PUBLICATIONS

Patent Abstracts of Japan, vol. 2000, No. 03, Mar. 30, 2000 & JP 11 334205 A (Mitsubishi Chemical Corp), Dec. 07, 1999 Zusammenfassung & JP 11 334205 A (Mitsubishi Chemical Corp) (Dec. 07, 1999) Seite 14; Abbildung 1; Beispiel 1.
Patent Abstracts of Japan, vol. 1999, No. 13, Nov. 30, 1999 & JP 11 221964 A (Mitsubishi Chemical Corp), Aug. 17, 1999 Zusammenfassung.

* cited by examiner

*Primary Examiner*—Elizabeth Mulvaney
(74) *Attorney, Agent, or Firm*—Godfried R. Akorli; Jill Danasvich

(57) ABSTRACT

The invention relates to a write-once optical data carrier in which organic and/or inorganic light-absorbing compounds are used as the information layer, especially for high-density optical data carriers which function with a blue laser in the wavelength range of 360–460 nm. The invention also relates to the application of the above-mentioned light-absorbing compound to a suitable substrate (especially polycarbonate), e.g., by spin coating.

11 Claims, No Drawings

USE OF LIGHT-ABSORBING COMPOUNDS IN THE INFORMATION LAYER OF OPTICAL DATA CARRIERS, AND OPTICAL DATA CARRIERS

The invention relates to the use of light-absorbent compounds in the information layer of write-once optical data carriers, to optical data carriers, and to a process for their production.

Write-once optical data carriers using organic and/or inorganic light-absorbent compounds or mixtures thereof are particularly suitable for use in high-density writeable optical data stores, for example with blue laser diodes, in particular GaN or SHG laser diodes (360–460 nm), and for use in DVD-R and CD-R disks, which operate with red (635–660 nm) or infrared (780–830 nm) laser diodes.

The write-once (recordable) compact disk (CD-R, 780 nm) has recently experienced enormous volume growth and represents the technically established system.

The next generation of optical data stores—DVDs—is currently being introduced onto the market. For the use of shorter-wave laser radiation (635–660 nm) and higher numerical aperture NA, the storage density can be increased. The writeable format in this case is DVD-R.

Today, optical data storage formats which use blue laser diodes (based on GaN, JP 08191171 or Second Harmonic Generation SHG JP 09050629) (360 nm–460 nm) with high laser power are being developed. Writeable optical data stores will therefore also be used in this generation. The achievable storage density depends on the focusing of the laser spot on the information plane. Spot size scales with the laser wavelength $\lambda$/NA. NA is the numerical aperture of the objective lens used. In order to obtain the highest possible storage density, the use of the smallest possible wavelength $\lambda$ is the aim. At present, 390 nm is possible on the basis of semiconductor laser diodes.

The patent literature describes dye-based writeable optical data stores which are equally suitable for CD-R and DVD-R systems (JP-A 11 043 481 and JP-A 10 181 206). JP-A 02 557 335, JP-A 10 058 828, JP-A 06 336 086, JP-A 02 865 955, WO-A 09 917 284 and U.S. Pat. No. 5,266,699 use a working wavelength of 450 nm.

Other concepts are concerned with the writing of the information using a short-wave laser, with the information being read out using a long-wave laser (JP-A 06 295 469). However, correction of the optics for two laser wavelengths at the same time is difficult. The use of only one laser both for writing and for reading the information is thus the target.

JP-A 11 110 815 describes a writeable optical disk which can be written at a wavelength of from 630 to 685 nm and can be read at wavelengths in the range from 630 to 685 or 400 to 550 nm. The disadvantage of the system is that it is not possible to write high-density information in the range from 400 to 500 nm. U.S. Pat. No. 5,871,882 describes the same principle for the wavelength ranges 600 to 700 nm for writing and reading and from 400 to 500 nm only for reading.

JP-A 07 304 257 and JP-A 11 334 207 describe porphyrin derivatives as dyes, JP-A 11 334 206 describes dicyanovinylphenyl compounds as dyes, JP-A 11 334 205 describes pyrazole-azo compounds as dyes, JP-A 11 334 204 describes pyridone-azo compounds as dyes, which are suitable for generating optical data stores which can be written using blue lasers.

The object of the invention is accordingly the provision of suitable compounds which satisfy the high requirements (such as light stability, favorable signal/noise ratio, damage-free application to the substrate material, and the like) for use in the information layer in a write-once optical data carrier, in particular for high-density writeable optical data store formats in a laser wavelength range from 360 to 460 nm.

Surprisingly, it has been found that specific light-absorbent compounds are highly suitable for the said purpose.

The invention therefore relates to the use of light-absorbent compounds in the information layer of write-once optical data carriers, where the UV absorber has an absorption maximum $\lambda_{max1}$ of from 340 to 410 nm and the wavelength $\lambda_{1/2}$, at which the absorbance on the long-wave edge of the absorption maximum of the wavelength $\lambda_{max1}$ is half the absorbance value at $\lambda_{max1}$, and the wavelength $\lambda_{1/10}$, at which the absorbance on the long-wave edge of the absorption maximum of wavelength $\lambda_{max1}$ is a tenth of the absorbance value at $\lambda_{max1}$, i.e. $\lambda_{1/2}$ and $\lambda_{1/10}$ both jointly lie in the wavelength range from 370 to 460 nm.

The preferred wavelength ranges and the light-absorbent compounds here are given below under the optical data carriers, which are likewise in accordance with the invention, and likewise apply to the use according to the invention.

The absorption spectra are measured, for example, in solution.

The light-absorbent compounds described above guarantee sufficiently high reflectivity (>10%) of the optical data carrier in the unwritten state and sufficiently high absorption for thermal degradation of the information layer on pointwise illumination with focused light if the light wavelength is in the range from 360 to 460 nm. The contrast between the written and unwritten points on the data carrier is achieved by the reflectivity change of the amplitude and also the phase of the incident light through the changed optical properties of the information layer after the thermal degradation.

The invention furthermore relates to a write-once optical data carrier comprising a preferably transparent substrate to whose surface at least one light-writeable information layer, if desired a reflection layer and/or if desired a protective layer have been applied and which can be written and read by means of blue light, preferably laser light, where the information layer comprises a light-absorbent compound and, if desired, a binder, wetting agent, stabilizers, diluents and sensitizers and further constituents, characterized in that the light-absorbent compound has an absorption maximum $\lambda_{max1}$ of from 340 to 410 nm and the wavelength $\lambda_{1/2}$, at which the absorbance on the long-wave edge of the absorption maximum of the wavelength $\lambda_{max1}$ is half the absorbance value at $\lambda_{max1}$, and the wavelength $\lambda_{1/10}$, at which the absorbance on the long-wave edge of the absorption maximum of the wavelength $\lambda_{max1}$ is a tenth of the absorbance value at $\lambda_{max1}$, are both jointly in the range from 370 to 460 nm.

Alternatively, the structure of the optical data carrier can:
- comprise a preferably transparent substrate to whose surface at least one light-writeable information layer, if desired a reflection layer and if desired an adhesive layer and a further preferably transparent substrate have been applied.
- comprise a preferably transparent substrate to whose surface if desired a reflection layer, at least one light-writeable information layer, if desired an adhesive layer and a transparent cover layer have been applied.

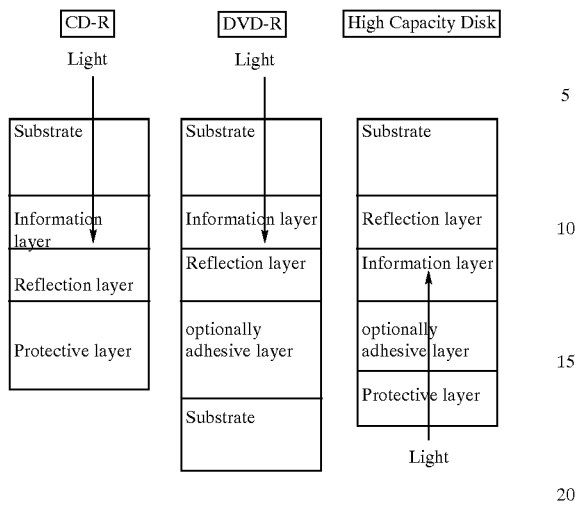

Preference is given to light-absorbent compounds having an absorption maximum $\lambda_{max1}$ of from 345 to 400 nm and a range in which $\lambda_{1/2}$ and $\lambda_{1/10}$ lie of from 380 to 430 nm.

Particular preference is given to light-absorbent compounds having an absorption maximum $\lambda_{max1}$ of from 350 to 380 nm and a range in which $\lambda_{1/2}$ and $\lambda_{1/10}$ lie of from 390 to 420 nm.

Very particular preference is given to compounds having an absorption maximum $\lambda_{max1}$ of from 360 to 370 nm and a range in which $\lambda_{1/2}$ and $\lambda_{1/10}$ lie of from 400 to 410 nm.

The invention relates to a write-once optical data carrier, characterized in that the light-absorbent compound has no further absorption maximum $\lambda_{max2}$ in the range from wavelengths greater than $\lambda_{max1}$ to a wavelength of 500 nm.

Preference is given to light-absorbent compounds which have no further absorption maximum $\lambda_{max2}$ in the range from wavelength greater than $\lambda_{max1}$ to a wavelength of 550 nm.

Particular preference is given to light-absorbent compounds which have no further absorption maximum $\lambda_{max2}$ in the range from wavelength greater than $\lambda_{max1}$ to a wavelength of 600 nm.

The invention relates to a write-once optical data carrier, characterized in that the light-absorbent compound has further, preferably strong absorptions and absorption maxima in the range of wavelengths shorter than $\lambda_{max1}$.

The invention relates to a write-once optical data carrier, characterized in that the molar absorption coefficient ε of the light-absorbent compound is >10 000 l/mol cm at the absorption maximum $\lambda_{max1}$.

Preference is given to a write-once optical data carrier, characterized in that the molar absorption coefficient ε of the light-absorbent compound is >15 000 l/mol cm at the absorption maximum $\lambda_{max1}$.

Particular preference is given to a write-once optical data carrier, characterized in that the molar absorption coefficient ε of the light-absorbent compound is >20 000 l/mol cm at the absorption maximum $\lambda_{max1}$.

Very particular preference is given to a write-once optical data carrier, characterized in that the molar absorption coefficient ε of the light-absorbent compound is >25 000 l/mol cm at the absorption maximum $\lambda_{max1}$.

The invention relates to the use of the light-absorbent compounds listed below in optical data carriers.

The invention relates to a write-once optical data carrier, characterized in that the light-absorbent compound is one of the following compounds:

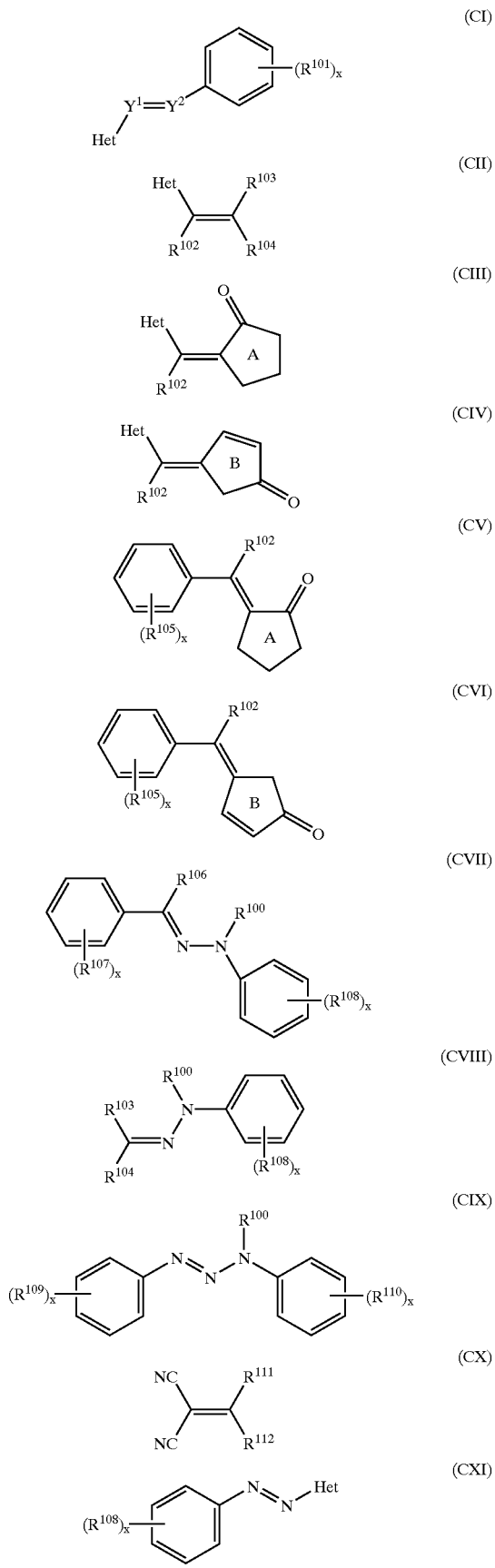

-continued

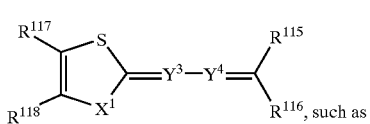  (CXII)

such as

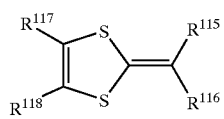  (CXIIa)

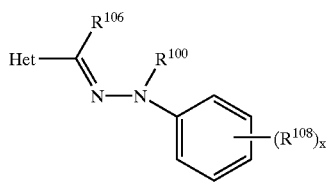  (CXIII)

in which
R$^{100}$ is hydrogen or C$_1$- to C$_4$-alkyl
x is an integer from 1 to 3 and where for x>1, the radicals may be different,
R$^{101}$ is hydrogen, halogen, nitro, C$_1$- to C$_{16}$-alkyl, C$_1$- to C$_{16}$-alkoxy, cyano, carboxyl or C$_1$- to C$_{16}$-alkoxycarbonyl,
Y$^1$ and Y$^2$, independently of one another, are C—R$^{102}$ and Y$^1$ or Y$^2$ may additionally be N,
R$^{102}$ is hydrogen, C$_6$- to C$_{10}$-aryl, C$_1$- to C$_{16}$-alkyl, cyano, carboxyl, C$_1$- to C$_{16}$-alkoxycarbonyl, C$_1$- to C$_{16}$-alkanoyl,
Het is benzothiazol-2-yl, benzoxazol-2-yl, benzimidazol-2-yl, thiazol-2-yl, 1,3,4-thiadiazol-2-yl, 2- or 4-pyridyl, 2- or 4-quinolyl or 3,3-dimethylindolen-2-yl, each of which may be substituted by methyl, ethyl, methoxy, ethoxy, chlorine, bromine, iodine, cyano, nitro, methoxycarbonyl, methylthio, dimethylamino, diethylamino or dipropylamino, and
each of which may optionally be quaternized on the nitrogen by alkyl or (C$_2$H$_4$O)$_n$H, where n=1–16, and contain alkylSO$_3^-$, alkoxySO$_3^-$ or halogen$^-$ as counterion, or is furan-2- or -3-yl, thiophen-2- or -3-yl, pyrrol-2- or -3-yl, N-alkylpyrrol-2- or -3-yl, each of which may be substituted by methyl, ethyl, methoxy, ethoxy, chlorine, cyano, nitro, methoxycarbonyl, methylthio, dimethylamino, diethylamino or dipropylamino and/or may be benzo-fused,
R$^{103}$ and R$^{104}$, independently of one another, are cyano, carboxyl, C$_1$- to C$_{16}$-alkoxycarbonyl, aminocarbonyl or C$_1$- to C$_{16}$-alkanoyl, or R$^{104}$ is hydrogen, CH$_2$—COOalkyl or P(O)(O—C$_1$- to C$_{12}$-alkyl)$_2$ or C$_1$- to C$_{16}$-alkyl
A is a five- or six-membered carbocyclic or heterocyclic ring, which may be benzo-fused,
B is a five- or six-membered carbocyclic or heterocyclic ring, which may be benzo-fused,
R$^{105}$ is hydrogen, halogen, C$_1$- to C$_{16}$-alkyl, C$_1$- to C$_{16}$-alkoxy, cyano, nitro, carboxyl or C$_1$- to C$_{16}$-alkoxycarbonyl,
R$^{106}$ is hydrogen, C$_1$- to C$_4$-alkyl, C$_1$- to C$_{16}$-alkoxycarbonyl or cyano,
R$^{107}$ is hydrogen, halogen, C$_1$- to C$_{16}$-alkyl, C$_1$- to C$_{16}$-alkoxy, nitro, cyano or C$_1$- to C$_{16}$-alkoxycarbonyl,
R$^{108}$ is hydrogen, nitro, cyano, halogen, C$_1$- to C$_{16}$-alkyl, carboxyl, C$_1$- to C$_{16}$-alkoxycarbonyl or C$_1$- to C$_{16}$-alkoxy, R$^{109}$ and R$^{110}$, independently of one another, are hydrogen, cyano, nitro, halogen, carboxyl, C$_1$- to C$_{16}$-alkoxycarbonyl or C$_1$- to C$_{16}$-alkanoyl, C$_1$- to C$_{16}$-alkyl or C$_1$- to C$_{16}$-alkoxy,
R$^{111}$ is cyano, CH=CH—NR$^{113}$R$^{114}$,
X$^1$ is S or N—R$^{100}$,
=Y$^3$—Y$^4$= is a direct double bond or is =N—N=,
R$^{112}$ is hydrogen, anilino, N—C$_1$- to C$_{16}$-alkylanilino or N=CH—NR$^{113}$R$^{114}$ or R$^{111}$ and R$^{112}$ are =C=C—NR$^{113}$R$^{114}$,
R$^{113}$ and R$^{114}$, independently of one another, are hydrogen, C$_1$- to C$_{16}$-alkyl,
R$^{115}$ and R$^{116}$, independently of one another, are cyano, carboxyl, C$_1$- to C$_{16}$-alkoxycarbonyl, aminocarbonyl, P(O)(O—C$_1$- to C$_{12}$-alkyl)$_2$ or C$_1$- to C$_{16}$-alkanoyl, or R$^{115}$ and R$^{116}$, together with the carbon atom connecting them, form a carbocyclic or heterocyclic, optionally benzo-fused five- or six-membered ring,
R$^{117}$ and R$^{118}$, independently of one another, are hydrogen, C$_1$- to C$_{16}$-alkyl, cyano, SCOC$_6$- to C$_{10}$-aryl, carboxyl, C$_1$- to C$_{16}$-alkoxycarbonyl or C$_1$- to C$_{16}$-alkanoyl or together are a —CH=CH—CH=CH— bridge, where the alkyl, alkoxy, aryl and heterocyclic radicals may optionally carry further radicals, such as alkyl, halogen, nitro, cyano, CO—NH$_2$, alkoxy, trialkylsilyl, trialkylsiloxy or phenyl, the alkyl and alkoxy radicals may be straight-chain or branched, the alkyl radicals may be partially or perhalogenated, the alkyl and alkoxy radicals may be ethoxylated or propoxylated or silylated, adjacent alkyl and/or alkoxy radicals on aryl or heterocyclic radicals may jointly form a three- or four-membered bridge, and the heterocyclic radicals may be benzo-fused.

Suitable light-absorbent compounds are also:

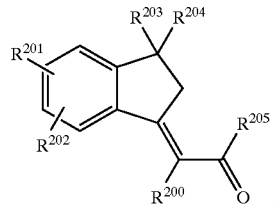  (CCI)

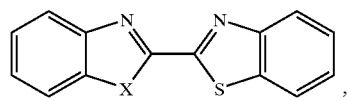  (CCII)

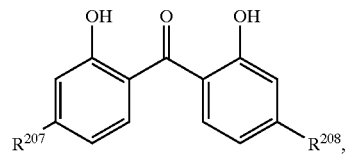  (CCIII)

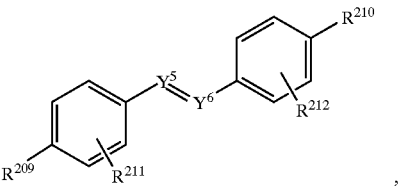  (CCIV)

, such as

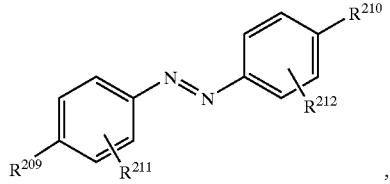
(CCIVa)

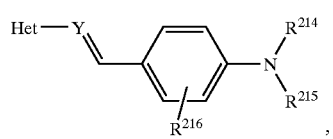
(CCV)

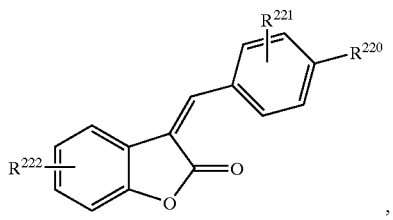
(CCVI)

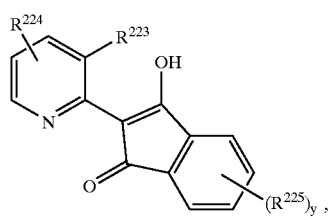
(CCVII)

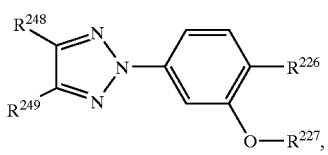
(CCVIII)

in which $R^{200}$ is cyano, $C_6$- to $C_{10}$aryl or $C_1$- to $C_{16}$-alkoxycarbonyl, $R^{201}$ and $R^{202}$, independently of one another, are hydrogen, halogen, $C_1$- $C_{16}$-alkyl, $C_1$- to $C_{16}$-alkoxy, or $R^{201}$ and $R^{202}$, if they are in the o-position to one another, may form a three- or four-membered bridge, preferably such as —O—CH$_2$—O—, —O—CF$_2$—O—, —O—(CH$_2$)$_2$—O—, —O—(CH$_2$)$_2$—, $R^{203}$ and $R^{204}$, independently of one another, are hydrogen or $C_1$- to $C_{16}$-alkyl, $R^{205}$ is $C_1$- to $C_{16}$-alkyl, $C_1$- to $C_{16}$-alkoxy, $C_1$ to $C_{16}$-mono- or dialkylamino, or $R^{205}$ is a divalent radical, such as —O(CH$_2$)$_n$—O—, —O(CH$_2$CH$_2$O)$_n$— or —O(CH$_2$(CHCH$_3$)O)$_n$— which connects two radicals of the formula (CCI) to one another, n is an integer from 1 to 16, or $R^{200}$ and $R^{205}$ together may form a three- or four-membered bridge, preferably such as —(CO)—(CH$_2$)$_3$—, —(CO)—CH$_2$—C(CH$_3$)$_2$—CH$_2$—, —(CO)—O—C(CH$_3$)$_2$—O— or —(CO)-o-C$_6$H$_4$—, X is S or N—$R^{206}$, $R^{206}$ and $R^{227}$, independently of one another, are $C_1$- to $C_{16}$-alkyl, $R^{207}$ and $R^{208}$, independently of one another, are hydroxyl, $C_1$- to $C_{16}$-alkoxy or $C_6$- to $C_{10}$-aryloxy, $R^{209}$ and $R^{210}$, independently of one another, are $C_1$- to $C_{16}$-alkoxy, $C_1$- to $C_{16}$-alkylthio, NR$^{217}$R$^{218}$, $C_6$- to $C_{16}$-aryloxy, cyano, CO—OR$^{217}$, CO—NR$^{217}$R$^{218}$, NR$^{218}$—CO—R$^{219}$, NR$^{218}$—SO$_2$—R$^{219}$, and $R^{209}$ is additionally hydrogen or $C_1$- to $C_{16}$-alkyl, $R^{211}$ and $R^{212}$, independently of one another, are hydrogen, halogen, $C_1$- to $C_{16}$-alkyl, $C_1$- to $C_{16}$-alkoxy or NR$^{218}$—CO—R$^{219}$, Het is benzothiazol-2-yl, benzoxazol-2-yl, benzimidazol-2-yl, thiazol-2-yl, 1,3,4-thiadiazol-2-yl, 2- or 4-pyridyl, 2- or 4-quinolyl, pyrrol-2- or -3-yl, thiophen-2- or -3-yl, furan-2- or -3-yl, indol-2- or -3-yl, benzothiophen-2-yl, benzofuran-2-yl or 3,3-dimethylindolen-2-yl, which may be substituted by methyl, ethyl, methoxy, ethoxy, chlorine, cyano, nitro, methoxycarbonyl, methylthio, dimethylamino, diethylamino or dipropylamino, Y, $Y^5$ and $Y^6$, independently of one another, are N or C—R$^{213}$, $R^{213}$ is hydrogen, $C_1$- to $C_4$-alkyl, cyano, CO—R$^{219}$, CO—O—R$^{217}$ or CO—NR$^{217}$R$^{218}$, $R^{214}$ and $R^{215}$, independently of one another, are hydrogen, $C_1$- to $C_{16}$-alkyl, CO—R$^{219}$ or $C_6$- to $C_{10}$-aryl, or NR$^{214}$R$^{215}$ is pyrrolidino, piperidino or morpholino, $R^{216}$ is hydrogen, halogen, $C_1$- to $C_{16}$-alkyl, $C_1$- to $C_{16}$-alkoxy or NH—CO—R$^{219}$, $R^{217}$ and $R^{218}$, independently of one another, are hydrogen, $C_1$- to $C_{16}$-alkyl or $C_6$- to $C_{10}$-aryl, $R^{219}$ is $C_1$- to $C_{16}$-alkyl or $C_6$- to $C_{10}$-aryl, $R^{220}$ to $R^{222}$, independently of one another, are hydrogen, $C_1$- to $Cl_6$-alkyl or $C_1$- to $C_{16}$-alkoxy, where $R^{220}$ and $R^{221}$, if they are in the o-position to one another, may jointly form an —O—CH$_2$—O—, —O—CF$_2$—O—, —O—(CH$_2$)$_2$—O— or —O—(CH$_2$)$_2$— bridge, $R^{223}$ is hydrogen or hydroxyl, $R^{224}$ is hydrogen, halogen or $C_1$- to $C_{16}$-alkyl, $R^{225}$ is hydrogen or halogen, y is an integer from 1 to 4, $R^{226}$ is CHO, CN, CO—$C_1$- to $C_8$-alkyl, CO—$C_6$- to $C_{10}$-aryl or CH=C(CO—$C_1$- to $C_8$-alkyl)-CH$_2$—CO—$C_1$- to $C_8$-alkyl, and $R^{248}$ and $R^{249}$, independently of one another, are hydrogen, $C_1$- to $C_{16}$-alkyl or $C_6$- to $C_{10}$-aryl or together are a —CH=CH—CH=CH— or o-C$_6$H$_4$—CH=CH—CH=CH— bridge, where the alkyl, alkoxy, aryl and heterocyclic radicals may optionally carry further radicals, such as alkyl, halogen, nitro, cyano, CO—NH$_2$, alkoxy, trialkylsilyl, trialkylsiloxy or phenyl, the alkyl and alkoxy radicals may be straight-chain or branched, the alkyl radicals may be partially or perhalogenated, the alkyl and alkoxy radicals may be ethoxylated or propoxylated or silylated, adjacent alkyl and/or alkoxy radicals on aryl or heterocyclic radicals may jointly form a three- or four-membered bridge, and the heterocyclic radicals may be benzo-fused.

Suitable light-absorbent compounds are also:

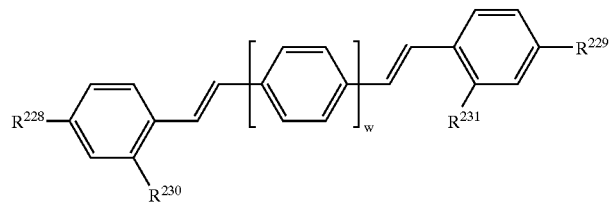
(CCIX)
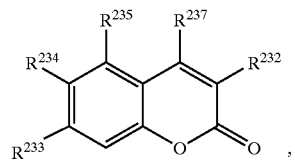
(CCX)
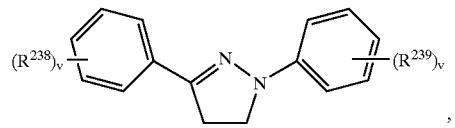
(CCXI)
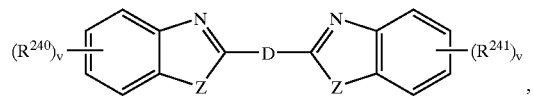
(CCXII)
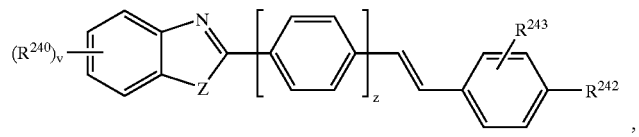
(CCXIII)
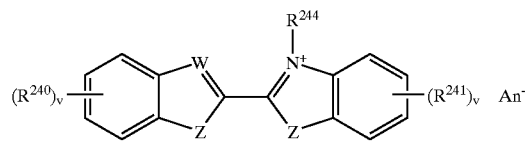
(CCXIV)
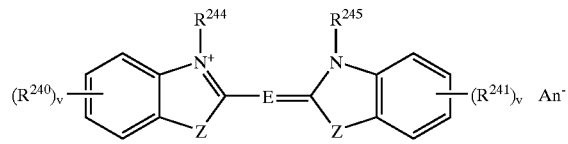
(CCXV)
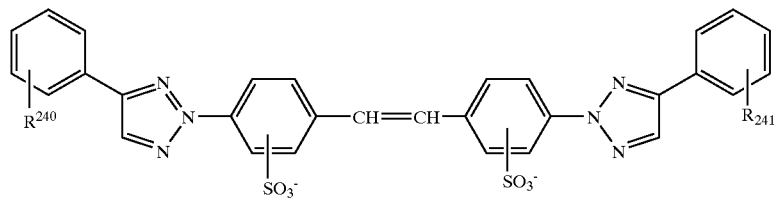
(CCXVI)

-continued

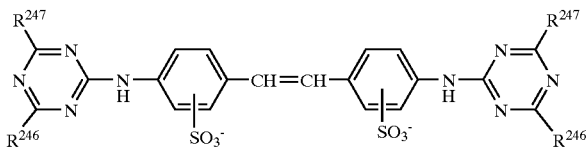

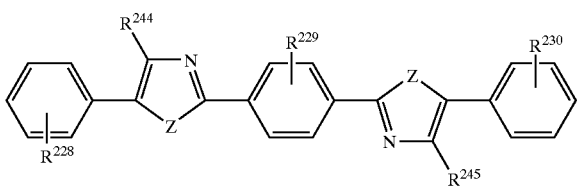

in which
R$^{228}$ to R$^{231}$, independently of one another, are hydrogen, halogen, cyano, C$_1$- to C$_{16}$-alkyl, C$_1$- to C$_{16}$-alkoxy or C$_1$- to C$_{16}$-alkoxycarbonyl,
w is 1 or 2,
R$^{232}$ is hydrogen, cyano, CO—O—C$_1$-to C$_4$-alkyl, C$_6$- to C$_{10}$-aryl, thiophen-2-yl, pyrid-2- or 4-yl, pyrazol-1-yl or 1,2,4-triazol-1- or -4-yl,
R$^{233}$ is hydrogen, C$_1$- to C$_{16}$-alkoxy, 1,2,3-triazol-2-yl or di-C$_1$- to C$_{16}$-alkylamino,
R$^{234}$ and R$^{235}$ are hydrogen or together are a —CH=CH—CH=CH— bridge,
R$^{237}$ is hydrogen, C$_1$- to C$_{16}$-alkyl or cyano,
R$^{238}$ and R$^{239}$, independently of one another, are hydrogen, halogen, CO—C$_1$- to C$_{16}$-alkyl, SO$_2$—C$_1$- to C$_{16}$-alkyl or SO$_2$—NH—C$_1$- to C$_{16}$-alkylA$^+$ An$^-$,
A$^+$ is N(C$_1$- to C$_{16}$-alkyl)$_3^+$ or pyridinio,
R$^{240}$, R$^{241}$ and R$^{243}$, independently of one another, are hydrogen, halogen, C$_1$- to C$_{16}$-alkyl or CO—O—C$_1$- to C$_{16}$-alkyl, and
R$^{240}$ and R$^{241}$ are additionally —CH$_2$—A$^+$ An$^-$,
v is an integer from 1 to 3, where for v>1, the radicals may have different meanings,
D is —CH=CH—, thiophen-2,5-diyl, furan-2,5-diyl or p-phenylene,
Z is O, S or N—R$^{244}$,
W is N or CH,
R$^{242}$ is hydrogen, cyano or CO—O—C$_1$- to C$_{16}$-alkyl,
z is 0 or 1,
R$^{244}$ and R$^{245}$, independently of one another, are C$_1$- to C$_{16}$-alkyl,
An$^-$ is an anion,
Cat$^+$ is Na$^+$, Li$^+$, NH$_4^+$ or N(C$_1$- to C$_{12}$-alkyl)$_4^+$,
E is CH, C—CN or N,
R$^{246}$ and R$^{247}$, independently of one another, are C$_1$- to C$_{16}$-alkylamino, C$_1$- to C$_{16}$-dialkylamino, anilino, morpholino, piperidino or pyrrolidino,
where the alkyl, alkoxy, aryl and heterocyclic radicals may optionally carry further radicals, such as alkyl, halogen, hydroxyalkyl, nitro, cyano, CO—NH$_2$, alkoxy, alkoxycarbonyl, trialkylsilyl, trialkylsiloxy or phenyl, the alkyl and alkoxy radicals may be straight-chain or branched, the alkyl radicals may be partially or perhalogenated, the alkyl and alkoxy radicals may be ethoxylated or propoxylated or silylated, adjacent alkyl and/or alkoxy radicals on aryl or heterocyclic radicals may jointly form a three- or four-membered bridge, and the heterocyclic radicals may be benzo-fused.

(CCXVII)

(CCXVIII)

Suitable light-absorbent compounds are also:

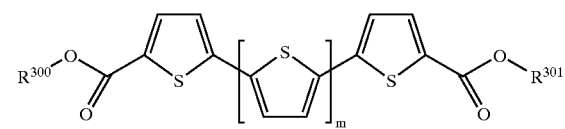 (CCCI)

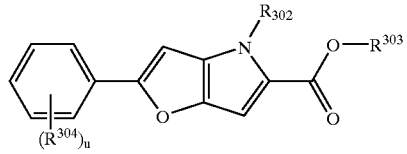 (CCCII)

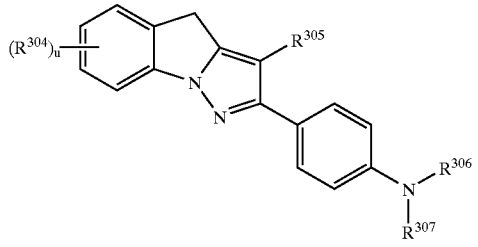 (CCCIII)

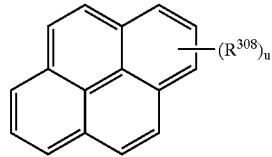 (CCCIV)

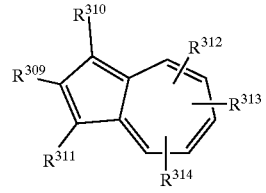 (CCCV)

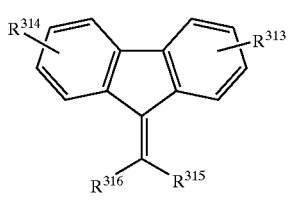 (CCCVI)

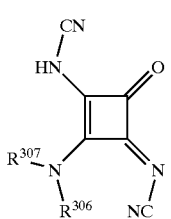
(CCCVII)

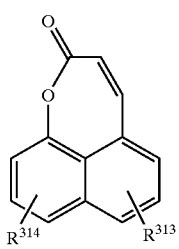
(CCCVIII)

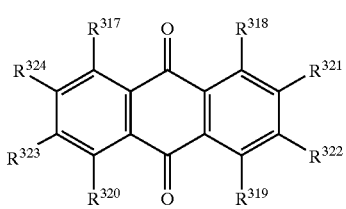
(CCCIX)

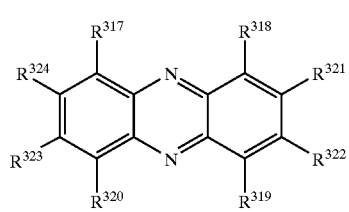
(CCCX)

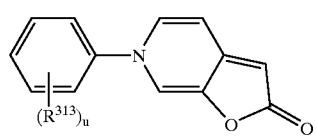
(CCCXI)

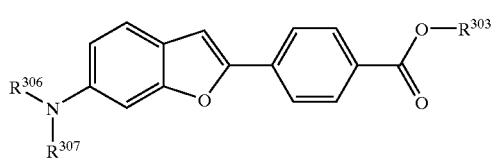
(CCCXII)

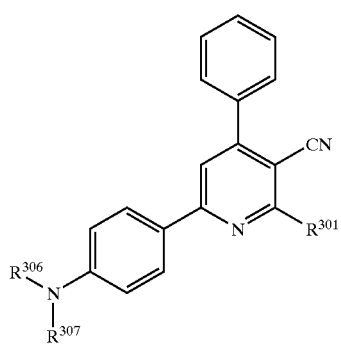
(CCCXIII)

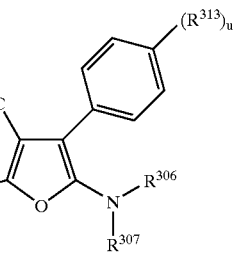
(CCCXIV)

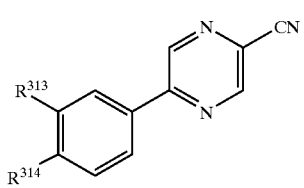
(CCCXV)

in which
$R^{300}$, $R^{301}$ and $R^{303}$, independently of one another, are hydrogen or $C_1$- to $C_{16}$-alkyl,
m is an integer from 0 to 10,
u is an integer from 1 to 3, where for u>1, the radicals may be different,
$R^{302}$ is hydrogen, $C_1$- to $C_{16}$-alkoxycarbonyl or $C_1$- to $C_{16}$-alkyl,
$R^{304}$ is hydrogen, halogen, cyano, nitro, $C_1$- to $C_{16}$-alkoxy, di-$C_1$-$C_8$-alkylamines, $C_1$- to $C_{16}$-alkoxycarbonyl or $C_1$- to $C_{16}$-alkyl,
$R^{305}$ is hydrogen, $C_1$- to $C_{16}$-alkoxy, $C_1$- to $C_{16}$-alkoxycarbonyl or $C_1$- to $C_{16}$-alkyl,
$R^{306}$ and $R^{307}$, independently of one another, are hydrogen, $C_1$- to $C_{16}$-alkyl or $C_6$- to $C_{10}$-aryl, or $NR^{306}R^{307}$ is morpholino, piperidino or pyrrolidino,
$R^{308}$ is $C_1$- to $C_{16}$-alkoxycarbonyl, carboxyl, $C_1$- to $C_{16}$-alkyl, $C_1$- to $C_{16}$-alkoxy, $C_1$- to $C_{16}$-alkylaminocarbonyl or $C_1$- to $C_{16}$-dialkylaminocarbonyl,
$R^{309}$ to $R^{314}$, independently of one another, are hydrogen, $C_6$- to $C_{10}$-aryl, carboxyl, cyano, $C_1$- to $C_{16}$-alkoxycarbonyl, $C_1$- to $C_{16}$-alkoxy or $C_1$- to $C_{16}$-alkyl,
$R^{315}$ and $R^{316}$, independently of one another, are carboxyl, $C_1$- to $C_{16}$-alkoxycarbonyl, $C_1$- to $C_{16}$-alkoxy or cyano, or $R^{315}$ and $R^{316}$, together with the carbon atom connecting them, form a 5- or 6-membered carbocyclic or heterocyclic ring,
$R^{317}$ to $R^{324}$, independently of one another, are $C_1$- to $C_{16}$-alkyl, hydrogen, hydroxyl, carboxyl, $C_1$- to $C_{16}$-alkoxycarbonyl, $C_1$- to $C_{16}$-alkoxy, $C_6$- to $C_{10}$-aryloxy or cyano,
where
the alkyl, alkoxy, aryl and heterocyclic radicals may optionally carry further radicals, such as alkyl, halogen, hydroxyalkyl, nitro, cyano, CO—$NH_2$, alkoxy, alkoxycarbonyl, trialkylsilyl, trialkylsiloxy or phenyl, the alkyl and alkoxy radicals may be straight-chain or branched, the alkyl radicals may be partially or perhalogenated, the alkyl and alkoxy radicals may be ethoxylated or propoxylated or silylated, adjacent alkyl and/or alkoxy radicals on aryl or heterocyclic radicals may jointly form a three- or four-membered bridge, and the heterocyclic radicals may be benzo-fused.

Suitable light-absorbent compounds are also:
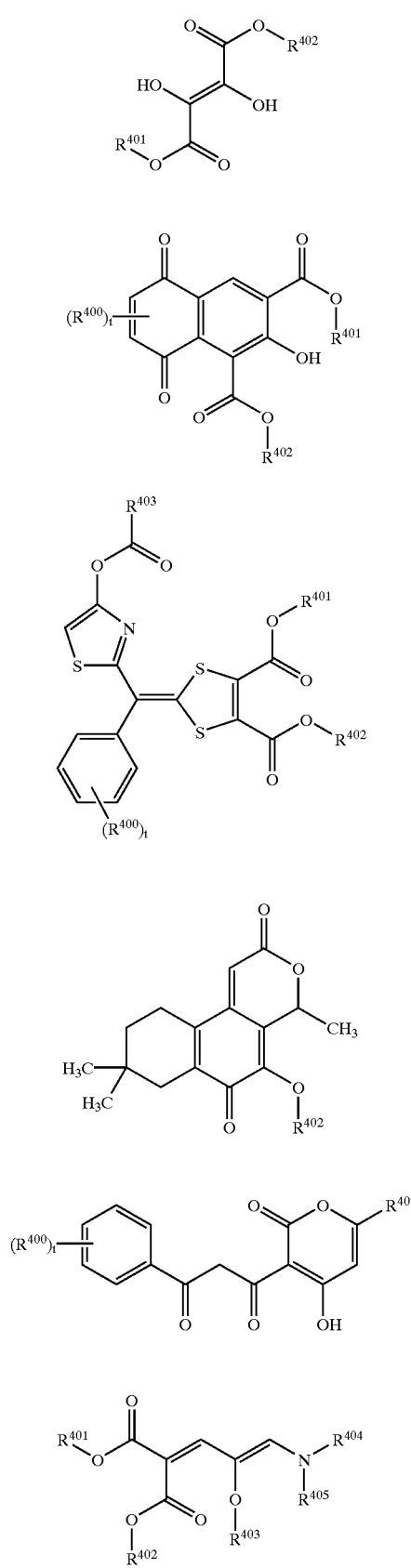
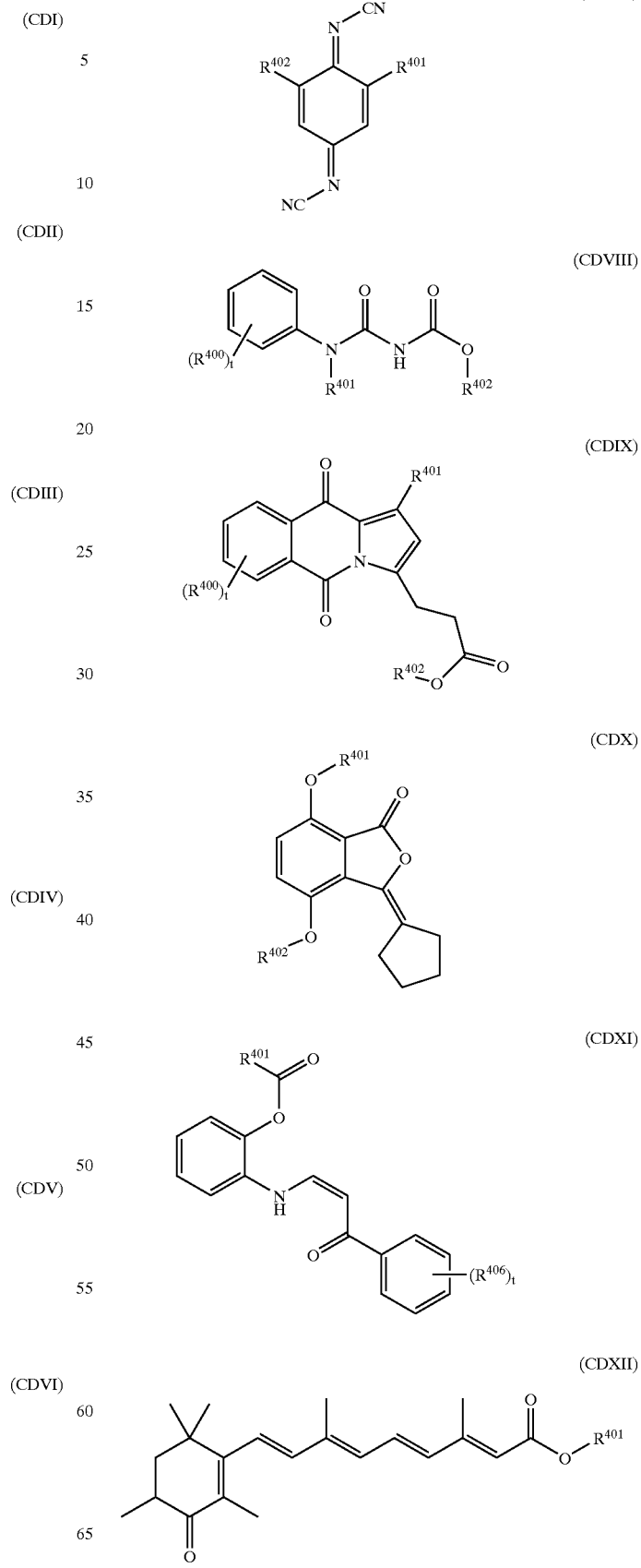

-continued

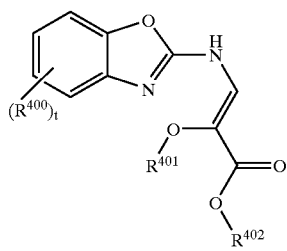
(CDXIII)

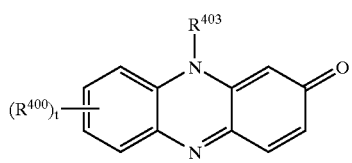
(CDXIV)

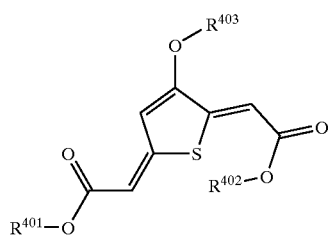
(CDXV)

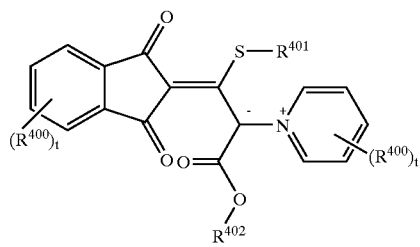
(CDXVI)

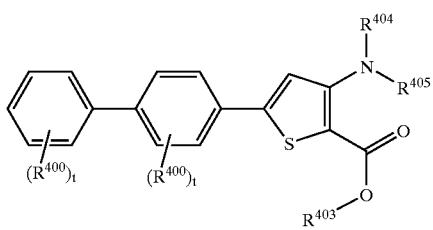
(CDXVII)

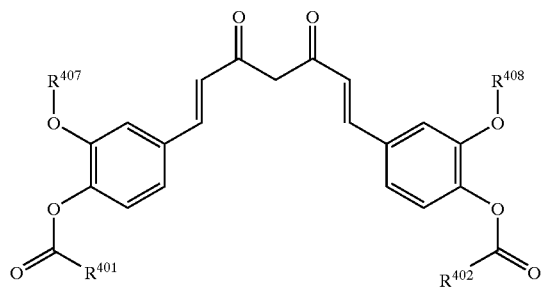
(CDXVIII)

-continued

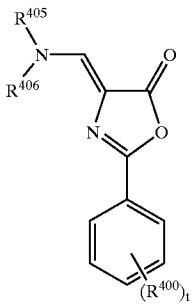
(CDXIX)

in which
$R^{400}$ is hydrogen, $C_1$- to $C_{12}$-alkyl or $C_1$- to $C_{12}$-alkoxy,
t is an integer from 1 to 3, where for t>1, the radicals may be different,
$R^{401}$ and $R^{402}$, independently of one another, are hydrogen or $C_1$- to $C_{16}$-alkyl,
$R^{403}$ is hydrogen, $C_6$- to $C_{10}$-aryl or $C_1$- to $C_{16}$-alkyl,
$R^{404}$ and $R^{405}$, independently of one another, are $C_1$- to $C_{16}$-akyl, $C_6$- to $C_{10}$-aryl or $NR^{404}R^{405}$ is morpholino, piperidino or pyrrolidino,
$R^{406}$ is hydrogen, cyano, nitro, carboxyl, $C_1$- to $C_{16}$-alkyl, $C_1$- to $C_{16}$-alkoxy or $C_1$- to $C_{16}$-alkoxycarbonyl,
$R^{407}$ and $R^{408}$, independently of one another, are hydrogen or $C_1$- to $C_{16}$-alkyl,
where
the alkyl, alkoxy, aryl and heterocyclic radicals may optionally carry further radicals, such as alkyl, halogen, hydroxyalkyl, nitro, cyano, CO—$NH_2$, alkoxy, alkoxycarbonyl, or phenyl, the alkyl and alkoxy radicals may be straight-chain or branched, the alkyl radicals may be partially or perhalogenated, the alkyl and alkoxy radicals may be ethoxylated or propoxylated or silylated, adjacent alkyl and/or alkoxy radicals on aryl or heterocyclic radicals may jointly form a three- or four-membered bridge, and the heterocyclic radicals may be benzo-fused.

Preference is given to light-absorbent compounds of the formulae (CI) to (CXIII),
in which
$R^{100}$ is hydrogen, methyl, ethyl or propyl
x is an integer from 1 to 2 and where for x>1, the radicals may be different,
$R^{101}$ is hydrogen, chlorine, bromine, methyl, ethyl, propyl, butyl, pentyl, hexyl, octyl, decyl, hydroxyethyl, methoxyethyl, ethoxypropyl, nitro, methoxy, ethoxy, propoxy, butoxy, pentoxy, hexoxy, octoxy, decoxy, methoxyethoxy, phenoxy, cyano, carboxyl, methoxycarbonyl, ethoxycarbonyl, propoxycarbonyl, butoxycarbonyl, pentoxycarbonyl, hexoxycarbonyl, octoxycarbonyl or decoxycarbonyl,
$Y^1$ is N or C—$R^{102}$,
$Y^2$ is C—$R^{102}$,
$R^{102}$ is hydrogen, phenyl, tolyl, methoxyphenyl, chlorophenyl, methyl, ethyl, propyl, butyl, benzyl, phenylpropyl, cyano, carboxyl, methoxycarbonyl, ethoxycarbonyl, propoxycarbonyl, butoxycarbonyl, formyl, acetyl, propanoyl or butanoyl,
Het is benzothiazol-2-yl, benzoxazol-2-yl, benzimidazol-2-yl, thiazol-2-yl, 1,3,4-thiadiazol-2-yl, 2- or 4-pyridyl, 2- or 4-quinolyl or 3,3-dimethylindolen-2-yl, each of which may optionally be quatemized on the nitrogen by alkyl or $(C_2H_4O)_nH$, where n=1–16, and contain alkyl$SO_3^-$, alkoxy$SO_3^-$ or halogen as counterion, or is furan-2-yl, thiophen-2-yl, pyrrol-2-yl, N-methyl- or N-ethyl-pyrrol-2-yl, benzofuran-2-yl, benzothiophen-2-yl, indol-2- or -3-yl or N-methyl- or N-ethyl-indol-2- or 3-yl, $R^{103}$ and $R^{104}$, independently of one another, are cyano, carboxyl, methoxycarbonyl, ethoxycarbonyl, propoxycarbonyl, butoxycarbonyl, pentoxycarbonyl, hexoxycarbonyl, octoxycarbonyl or decoxycarbonyl, aminocarbonyl, formyl, acetyl, propionyl, butanoyl, pentanoyl, hexanoyl, octanoyl, decanoyl, benzoyl or phenylacetyl, or $R^{104}$ is hydrogen, $CH_2$—COOmethyl, $CH_2$—COOethyl, $CH_2$—COOpropyl, $CH_2$—COObutyl, $P(O)(O\text{-methyl})_2$, $P(O)(O\text{-ethyl})_2$, $P(O)(O\text{-propyl})_2$, $P(O)(O\text{-butyl})_2$, methyl, ethyl, propyl, butyl, pentyl, hexyl, octyl, decyl, hydroxyethyl, methoxyethyl, ethoxypropyl, —$CH_2CH_2O$—(CO)—$CH=CH_2$, benzyl or phenylpropyl, A is (2-methyl-4H-oxazol-5-on)-4-ylidene, (2-styryl-4H-oxazol-5-on)-4-ylidene, (2-phenyl-4H-oxazol-5-on)-4-ylidene, (2,2-dimethyl-1,3-dioxane-4,6-dion)-5-ylidene, 5,5-dimethylcyclohexane-1,3-dion-2-ylidene, 5-phenylcyclohexane-1,3-dion-2-ylidene, indane-1,3-dion-2-ylidene, pyrrolidino-2,3-dion-4-ylidene or furan-4-dimethylethylidene-2,5-dion-3-ylidene, B is N-methyl-pyrrolin-2-on-3-ylidene, pyrrolin-2-on-3-ylidene, N-methyl-benzopyrrolin-2-on-3-ylidene, N-methyl-3,4-dimethyl-pyrrolin-2-on-3-ylidene, N-phenyl-pyrrolin-2-on-3-ylidene, (5H)-furanon-2-ylidene, 4-methyl-(5H)-furanon-2-ylidene, (5H)-benzofuranon-2-ylidene, 3H-methyl-pyran-2,6-dion-4-ylidene, 3H-pyran-2,6-dion-3-ylidene or 3H-benzopyran-2,6-dion-3-ylidene, $R^{105}$ is hydrogen, chlorine, bromine, methyl, ethyl, propyl, butyl, pentyl, hexyl, octyl, decyl, hydroxyethyl, methoxyethyl, ethoxypropyl, methoxy, ethoxy, propoxy, butoxy, pentoxy, hexoxy, octoxy, decoxy, methoxyethoxy, phenoxy, cyano, nitro, carboxyl, methoxycarbonyl, ethoxycarbonyl, propoxycarbonyl, butoxycarbonyl, pentoxycarbonyl, hexoxycarbonyl, octoxycarbonyl or decoxycarbonyl, $R^{106}$ is hydrogen, methyl, ethyl, propyl, butyl, methoxycarbonyl, ethoxycarbonyl, propoxycarbonyl, butoxycarbonyl, pentoxycarbonyl, hexoxycarbonyl, octoxy-carbonyl, decoxycarbonyl or cyano, $R^{107}$ is hydrogen, chlorine, fluorine, bromine, methyl, ethyl, propyl, butyl, pentyl, hexyl, octyl, decyl, hydroxyethyl, methoxyethyl, ethoxypropyl, methoxy, ethoxy, propoxy, butoxy, pentoxy, hexoxy, octoxy, decoxy, methoxyethoxy, phenoxy, nitro, cyano, methoxycarbonyl, ethoxycarbonyl, propoxycarbonyl, butoxycarbonyl, pentoxycarbonyl, hexoxycarbonyl, octoxycarbonyl or decoxycarbonyl, $R^{108}$ is hydrogen, chlorine, fluorine, bromine, methyl, ethyl, propyl, butyl, pentyl, hexyl, octyl, decyl, hydroxyethyl, methoxyethyl, ethoxypropyl, methoxy, ethoxy, propoxy, butoxy, pentoxy, hexoxy, octoxy, decoxy, methoxyethoxy, phenoxy, nitro, cyano, methoxycarbonyl, ethoxycarbonyl, propoxycarbonyl, butoxycarbonyl, pentoxycarbonyl, hexoxycarbonyl, octoxycarbonyl or decoxycarbonyl, $R^{109}$ and $R^{110}$, independently of one another, are hydrogen, chlorine, fluorine, bromine, methyl, ethyl, propyl, butyl, pentyl, hexyl, octyl, decyl, hydroxyethyl, methoxyethyl, ethoxypropyl, formyl, acetyl, propionyl, butanoyl, pentanoyl, hexanoyl, octanoyl, decanoyl, benzoyl, phenylacetyl, methoxy, ethoxy, propoxy, butoxy, pentoxy, hexoxy, octoxy, decoxy, methoxyethoxy, phenoxy, nitro, cyano, methyl, ethyl, propyl, butyl, pentyl, hexyl, octyl or decyl, $R^{111}$ is cyano or CH=CH—$NR^{113}R^{114}$, $R^{112}$ is hydrogen, anilino, N-methylanilino, N-ethylanilino, N-propylanilino, N-butylanilino, N-pentylanilino, N-hexylanilino, N-octylanilino, N-decylanilino or N-hydroxyethylanilino, where the anilino radical may be substituted by 1 to 3 radicals from the group consisting of methyl, ethyl, propyl, butyl, chlorine, fluorine, methoxy, ethoxy, propoxy, butoxy, nitro, cyano, methoxycarbonyl, ethoxycarbonyl, propoxycarbonyl, butoxycarbonyl and phenyl, or is N=CHNR$^{113}$R$^{114}$, or R$^{111}$ and R$^{112}$, together with the carbon atom connecting them, are =C=C—NR$^{113}$R$^{114}$, $R^{113}$ and $R^{114}$, independently of one another, are hydrogen, methyl, ethyl, propyl, butyl, pentyl, hexyl, octyl or decyl, $X^1$ is S, =$Y^3$—$Y^4$= is a direct double bond, $R^{115}$ and $R^{116}$, independently of one another, are cyano, carboxyl, methoxycarbonyl, ethoxycarbonyl, propoxycarbonyl, butoxycarbonyl, pentoxycarbonyl, hexoxy-carbonyl, octoxycarbonyl, decoxycarbonyl, aminocarbonyl, $P(O)(O\text{-methyl})_2$, $P(O)(O\text{-ethyl})_2$, $P(O)(O\text{-propyl})_2$, $P(O)(O\text{-butyl})_2$, $P(O)(O\text{-pentyl})_2$, formyl, acetyl, propionyl, butanoyl, pentanoyl, hexanoyl, octanoyl, decanoyl, benzoyl, phenylacetyl, or $R^{115}$ and $R^{116}$, together with the carbon atom connecting them, are (2-methyl-4H-oxazol-5-on)-4-ylidene, (2-styryl-4H-oxazol-5-on)-4-ylidene, (2-phenyl-4H-oxazol-5-on)-4-ylidene, (2,2-dimethyl-1,3-dioxane-4,6-dion)-5-ylidene, pyrrolidino-2,3-dion-4-ylidene, furan-4-dimethylethylidene-2,5-dion-3-ylidene, N-methylpyrrolin-2-on-3-ylidene, pyrrolin-2-on-3-ylidene, N-methyl-benzopyrrolin-2-on-3-ylidene, N-methyl-3,4-dimethyl-pyrrolin-2-on-3-ylidene, N-phenyl-pyrrolin-2-on-3-ylidene, (5H)-furanon-2-ylidene, 4-methyl-(5H)-furanon-2-ylidene, (5H)-benzofuranon-2-ylidene, 3H-4-methylpyran-2,6-dion-3-ylidene, 3H-pyran-2,6-dion-3-ylidene, 5,5-dimethylcyclohexan-1,3-dion-2-ylidene, 5-phenylcyclohexane-1,3-dion-2-ylidene, indane-1,3-dion-2-ylidene or 3H-benzopyran-2,6-dion-3-ylidene, $R^{117}$ and $R^{118}$, independently of one another, are hydrogen, methyl, ethyl, propyl, butyl, pentyl, hexyl, octyl, decyl, hydroxyethyl, methoxyethyl, ethoxypropyl, benzyl, phenylpropyl, cyano, SCOphenyl, SCOtolyl, SCOmethoxyphenyl, SCOchlorophenyl, carboxyl, formyl, acetyl, propionyl, butanoyl, pentanoyl, hexanoyl, octanoyl, decanoyl, benzoyl, phenylacetyl, methoxycarbonyl, ethoxycarbonyl, propoxycarbonyl, butoxycarbonyl, pentoxycarbonyl, hexoxycarbonyl, octoxycarbonyl or decoxycarbonyl, where the alkyl and alkoxy radicals may be straight-chain or branched, for example n-butyl, 2-butyl or tert-butyl, and may be partially or perfluorinated.

Particular preference is given to light-absorbent compounds of the formulae (CI) to (CXIII), in which $R^{100}$ is hydrogen, methyl, ethyl or propyl x is an integer from 1 to 2 and where for x>1, the radicals may be different, $R^{101}$ is hydrogen, bromine, methyl, ethyl, propyl, butyl, pentyl, hexyl, octyl, decyl, methoxyethyl, ethoxypropyl, nitro, methoxy, ethoxy, propoxy, butoxy, pentoxy, hexoxy, octoxy, decoxy, methoxyethoxy, cyano, methoxycarbonyl, ethoxycarbonyl, propoxycarbonyl, butoxycarbonyl, pentoxycarbonyl, hexoxycarbonyl, octoxycarbonyl or decoxycarbonyl, $Y^1$ and $Y^2$, independently of one another, are C—$R^{102}$, $R^{102}$ is hydrogen, phenyl, methyl, ethyl, cyano, methoxycarbonyl, ethoxycarbonyl or propoxycarbonyl, Het is benzothiazol-2-yl, benzoxazol-2-yl, benzimidazol-2-yl, thiazol-2-yl, 1,3,4-thiadiazol-2-yl, 2- or 4-pyridyl, 2- or 4-quinolyl, 3,3-dimethylindolen-2-yl, furan-2-yl, thiophen-2-yl, pyrrol-2-yl or N-alkyl-pyrrol-2-yl, $R^{103}$ and $R^{104}$, independently of one another, are cyano, methoxycarbonyl, ethoxycarbonyl, propoxycarbonyl, butoxycarbonyl, pentoxycarbonyl, hexoxycarbonyl, octoxycarbonyl or decoxycarbonyl, formyl, acetyl, propionyl, butanoyl, pentanoyl, hexanoyl, octanoyl, decanoyl, or $R^{104}$ is $CH_2$—COO—methyl, $CH_2$—COO-ethyl, $CH_2$—COO-propyl, $CH_2$—COO-butyl, P(O)(O-methyl)$_2$, P(O)(O-ethyl)$_2$, P(O)(O-propyl)$_2$, P(O)(O-butyl)$_2$ or hydrogen A is (2-methyl-4H-oxazol-5-on)-4-ylidene, (2-phenyl-4H-oxazol-5-on)-4-ylidene, (2,2-dimethyl-1,3-dioxane-4,6-dion)-5-ylidene, 5,5-dimethylcyclohexane-1,3-dion-2-ylidene, 5-phenylcyclohexane-1,3-dion-2-ylidene, indane-1,3-dion-2-ylidene or pyrrolidino-2,3-dion-4-ylidene, B is N-methylpyrrolin-2-on-3-ylidene, N-methyl-benzopyrrolin-2-on-3-ylidene, N-methyl-3,4-dimethyl-pyrrolin-2-on-3-ylidene, N-phenylopyrrolin-2-on-3-ylidene, (5H)-furanon-2-ylidene, 4-methyl-(5H)-furanon-2-ylidene, (5H)-benzfuranon-2-ylidene, 3H-4-methylopyran-2,6-dion-3-ylidene, 3H-pyran-2,6-dion-3-ylidene or 3H-benzopyran-2,6-dion-3-ylidene, $R^{105}$ is hydrogen, bromine, methyl, ethyl, propyl, butyl, pentyl, hexyl, octyl, decyl, methoxy, ethoxy, propoxy, butoxy, pentoxy, hexoxy, octoxy, decoxy, methoxyethoxy, cyano, nitro, methoxycarbonyl, ethoxycarbonyl, propoxycarbonyl, butoxycarbonyl, pentoxycarbonyl, hexoxycarbonyl, octoxycarbonyl or decoxycarbonyl, $R^{106}$ is hydrogen, methyl, ethyl, propyl or butyl, $R^{107}$ is hydrogen, chlorine, bromine, methyl, ethyl, propyl, butyl, methoxy, ethoxy, propoxy, butoxy, methoxyethoxy, nitro, cyano methoxycarbonyl, ethoxycarbonyl, propoxycarbonyl or butoxycarbonyl, $R^{108}$ is hydrogen, chlorine, bromine, methyl, ethyl, propyl, butyl, pentyl, hexyl, octyl, decyl, methoxy, ethoxy, propoxy, butoxy, pentoxy, hexoxy, octoxy, decoxy, methoxyethoxy, nitro, cyano methoxycarbonyl, ethoxycarbonyl, propoxycarbonyl, butoxycarbonyl, pentoxycarbonyl, hexoxycarbonyl, octoxycarbonyl or decoxycarbonyl, $R^{109}$ hydrogen, chlorine, bromine, methyl, ethyl, propyl, butyl, acetyl, propionyl, methoxy, ethoxy, propoxy, butoxy, methoxyethoxy, nitro or cyano, $R^{110}$ is hydrogen, chlorine, bromine, methyl, ethyl, propyl, butyl, pentyl, hexyl, octyl, decyl, acetyl, propionyl, methoxy, ethoxy, propoxy, butoxy, pentoxy, hexoxy, octoxy, decoxy, methoxyethoxy, nitro or cyano, $R^{111}$ is cyano, $R^{112}$ is anilino, N-methylanilino, N-ethylanilino, N-propylanilino, N-butylanilino, N-pentylanilino, N-hexylanilino, N-octylanilino, N-decylanilino or N-hydroxyethylanilino, where the anilino radical may be substituted by methyl, methoxy, ethoxy, chlorine, nitro, cyano or methoxycarbonyl, $X^1$ is S, =$Y^3$—$Y^4$= is a direct double bond, $R^{115}$ and $R^{116}$, independently of one another, are cyano, methyl, ethyl, propyl, butyl, P(O)(O-methyl)$_2$, P(O)(O-ethyl)$_2$, P(O)(O-propyl)$_2$, P(O)(O-butyl)$_2$, P(O)(O-pentyl)$_2$, acetyl, propionyl or butanoyl, or $R^{115}$ and $R^{116}$, together with the carbon atom connecting them, are (2-methyl-4H-oxazol-5-on)-4-ylidene, (2-phenyl-4H-oxazol-5-on)-4-ylidene, (2,2-dimethyl-1,3-dioxane-4,6-dion)-5-ylidene, pyrrolidino-2,3-dion-4-ylidene, N-methyl-pyrrolin-2-on-3-ylidene, pyrrolin-2-on-3-ylidene, N-methylbenzo-pyrrolin-2-on-3-ylidene, N-methyl-3,4-dimethyl-pyrrolin-2-on-3-ylidene, N-phenyl-pyrrolin-2-on-3-ylidene, (5H)-furanon-2-ylidene, 4-methyl-(5H)-furanon-2-ylidene, (5H)-benzofuranon-2-yliden, 3H-4-methyl-pyran-2,6-dion-3-ylidene, 3H-pyran-2,6-dion-3-yliden, 5,5-dimethylcyclohexane-1,3-dion-2-ylidene, 5-phenylcyclohexane-1,3-dion-2-ylidene, indane-1,3-dion-2-ylidene or 3H-benzopyran-2,6-dion-3-ylidene, $R^{117}$ and $R^{118}$, independently of one another, are hydrogen, methyl, ethyl, propyl, butyl, pentyl, hexyl, octyl, decyl, methoxyethyl, ethoxypropyl, cyano, SCO-phenyl, SCO-tolyl, SCO-methoxyphenyl, SCO-chlorophenyl, methoxycarbonyl, ethoxycarbonyl, propoxycarbonyl or butoxycarbonyl.

Very particular preference is given to light-absorbent compounds of the formulae (CI), (CII), (CIII), (CIV), (CVIII), (CXI), (CXII) and (CXIII).

Preference is likewise given to light-absorbent compounds of the formulae (CCI) to (CCVIII), in which $R^{200}$ is cyano, phenyl, tolyl, methoxyphenyl, chlorophenyl, methoxycarbonyl, ethoxycarbonyl, propoxycarbonyl or butoxycarbonyl, $R^{201}$ and $R^{202}$, independently of one another, are hydrogen, chlorine, bromine, methyl, ethyl, methoxy, ethoxy, propoxy or butoxy, or $R^{201}$ and $R^{202}$, if they are in the o-position to one another, form an —O—$CH_2$—O— or —O—$CF_2$—O— bridge, $R^{203}$ and $R^{204}$, independently of one another, are hydrogen, methyl or ethyl, $R^{205}$ is methyl, ethyl, propyl, butyl, pentyl, hexyl, octyl, decyl, hydroxyethyl, methoxyethyl, ethoxypropyl, benzyl, phenylpropyl, methoxy, ethoxy, propoxy, butoxy, pentoxy, hexoxy or benzyloxy, X is S or N—$R^{206}$, $R^{206}$ and $R^{227}$, independently of one another, are methyl, ethyl, propyl, butyl, pentyl, hexyl, heptyl or octyl, $R^{207}$ and $R^{208}$, independently of one another, are hydroxyl, methoxy, ethoxy, propoxy, butoxy, benzyloxy or phenoxy, $R^{209}$ and $R^{210}$, independently of one another, are methoxy, ethoxy, propoxy, butoxy, hexoxy, methoxyethoxy, methylthio, ethylthio, amino, $NR^{217}R^{218}$, phenoxy, cyano, CO—$OR^{217}$, CO—$NR^{217}R^{218}$, $NR^{218}$—CO—$R^{219}$ or $NR^{218}$—$SO_2$—$R^{219}$, and $R^{209}$ is additionally hydrogen, methyl, hydroxyethoxy, —$OCH_2CH_2$—O—(CO)—CH=$CH_2$, —O—$(CH_2)_4$—O—(CO)—C($CH_3$)=$CH_2$ or —NH—(CO)—$C_6H_4$—O—$CH_2CH_2$—O—(CO)—CH=$CH_2$, $R^{211}$ and $R^{212}$, independently of one another, are hydrogen, chlorine, methyl, ethyl, methoxy or ethoxy, Het is benzothiazol-2-yl, benzoxazol-2-yl or 2- or 4-pyridyl, Y is C—$R^{213}$, $Y^5$ and $Y^6$ are N, $R^{213}$ is hydrogen, cyano, CO—$R^{219}$, CO—O—$R^{217}$ or CO—$NR^{217}R^{218}$, $R^{214}$ and $R^{215}$, independently of one another, are methyl, ethyl, propyl, butyl, hexyl, methoxyethyl, hydroxyethyl, cyanethyl, benzyl, phenethyl, phenylpropyl, phenyl, tolyl, methoxyphenyl, chlorophenyl or CO—$R^{219}$, $NR^{214}R^{215}$ is pyrrolidino, piperidino or morpholino, $R^{216}$ is hydrogen, chlorine, bromine, methyl, ethyl, methoxy, ethoxy or NH—CO—$R^{219}$, $R^{217}$ and $R^{218}$, independently of one another, are methyl, ethyl, propyl, butyl, hexyl, benzyl, phenethyl, phenylpropyl, phenyl, tolyl, methoxyphenyl or chlorophenyl, and
$R^{218}$ is additionally hydrogen,
$R^{219}$ is methyl, ethyl, propyl, butyl or phenyl,
$R^{220}$ and $R^{221}$, independently of one another, are hydrogen, methyl, ethyl, propyl, butyl, methoxy, ethoxy, propoxy or butoxy,
$R^{222}$ and $R^{224}$ are hydrogen,
$R^{223}$ is hydrogen or hydroxyl,
$R^{225}$ is hydrogen, chlorine or bromine,
y is 4, and
$R^{226}$ is CHO or CN,
$R^{227}$ is butyl, pentyl, hexyl, heptyl or octyl,
$R^{248}$ is methyl, ethyl, propyl or butyl,
$R^{249}$ is methyl, ethyl, propyl, butyl or phenyl, or
$R^{248}$ and $R^{249}$ together are an o-$C_6H_4$—CH=CH—CH=CH— bridge,
where the alkyl and alkoxy radicals may be straight-chain or branched, for example n-butyl, 2-butyl or tert-butyl, and may be partially or perfluoriert.

Particular preference is likewise given to light-absorbent compounds of the formulae (CCI) to (CCVIII),
in which
$R^{200}$ is cyano,
$R^{201}$ and $R^{202}$ are methoxy,
$R^{203}$ and $R^{204}$ are methyl,
$R^{205}$ is propyl, butyl, pentyl, propoxy, butoxy or pentoxy,
X is N-(2-ethyl-1-hexyl),
$R^{207}$ and $R^{208}$ are hydroxyl,
$R^{209}$ and $R^{210}$ are identical and are methoxy, ethoxy, amino, NH-methyl, NH-ethyl, dimethylamino, diethylamino, cyano, CO—O-methyl, CO—O-n-butyl, CO—NH—n-butyl, CO—NH-phenyl, NH—CO-n-butyl, NH—CO-tert-butyl or NH—CO-phenyl,
$R^{211}$ and $R^{212}$, independently of one another, are hydrogen or methyl,
Het is benzothiazol-2-yl or 4-pyridyl,
Y is C—$R^{213}$,
$Y^5$ and $Y^6$ are N,
$R^{213}$ is hydrogen, cyano, CO—$NH_2$, acetyl or CO—O-methyl,
$R^{214}$ and $R^{215}$, independently of one another, are methyl, ethyl, butyl, cyanoethyl, benzyl, phenyl or acetyl,
$R^{216}$ is hydrogen, methyl or methoxy,
$R^{220}$ and $R^{221}$, independently of one another, are hydrogen, methyl, ethyl, propyl or butyl,
$R^{222}$ and $R^{224}$ are hydrogen,
$R^{223}$ is hydrogen,
$R^{225}$ is hydrogen,
y is 4,
$R^{226}$ is CHO,
$R^{248}$ is methyl,
$R^{249}$ is ethyl or phenyl or
$R^{248}$ and $R^{249}$ together are an o-$C_6H_4$—CH=CH—CH=CH— bridge.

Very particular preference is likewise given to light-absorbent compounds of the formulae (CCI), (CCV), (CCVI) and (CCVIII).

Preference is likewise given to light-absorbent compounds of the formulae (CCIX) to (CCXVIII),
in which
$R^{228}$ to $R^{231}$, independently of one another, are chlorine or cyano,
where two of these radicals may also be hydrogen, methyl, ethyl, propyl, butyl, pentyl, hexyl, octyl, decyl, hydroxyethyl, methoxyethyl, ethoxypropyl, methoxy, ethoxy, propoxy, butoxy, pentoxy, hexoxy, octoxy, decoxy, methoxyethoxy, methoxycarbonyl, ethoxycarbonyl, propoxycarbonyl, butoxycarbonyl, pentoxycarbonyl, hexoxycarbonyl, octoxycarbonyl or decoxycarbonyl,
w is 1,
$R^{232}$ is phenyl, tolyl, methoxyphenyl, pyrazol-1-yl, 4-chloropyrazol-2-yl or 1,2,4-triazol-1- or -4-yl,
$R^{233}$ is hydrogen, methoxy, ethoxy, 4-phenyl-5-methyl-1,2,3-triazol-2-yl, 4-ethyl-5-methyl-1,2,3-triazol-2-yl, dimethylamino or diethylamino,
$R^{234}$ and $R^{235}$ are hydrogen or together are a —CH=CH—CH=CH— bridge,
$R^{237}$ and $R^{243}$ are hydrogen,
$R^{238}$ and $R^{239}$, independently of one another, are chlorine, acetyl, propionyl, methylsulphonyl or $SO_2$—NH—$(CH_2)_3$—$N(CH_3)_3{}^+An^-$,
$R^{240}$ and $R^{241}$, independently of one another, are hydrogen, chlorine, bromine, methyl, ethyl, propyl or butyl,
v is is 1 or 2,
Z is O or N—$R^{244}$,
D is —CH=CH—, 1,4-phenylene, thiophene-2,5-diyl or furan-2,5-diyl,
$R^{242}$ is hydrogen, cyano or CO—O-methyl, -ethyl, -propyl or -butyl,
z is 0 or 1, and
W is N or CH,
$R^{244}$ and $R^{245}$, independently of one another, are methyl, ethyl, propyl, butyl, pentyl, hexyl, octyl, decyl, hydroxyethyl, methoxyethyl, ethoxypropyl, benzyl or phenylpropyl,
An$^-$ is an anion,
cat$^+$ is Na$^+$, Li$^+$, $NH_4{}^+$ or N(methyl, ethyl, propyl, butyl, pentyl, hexyl, octyl, decyl, hydroxyethyl, methoxyethyl or ethoxypropyl)$_4{}^+$,
E is CH or N,
$R^{246}$ and $R^{247}$, independently of one another, are (methyl, ethyl, propyl, butyl, pentyl, hexyl, octyl, decyl, hydroxyethyl, methoxyethyl or ethoxypropyl)-amino, di(methyl, ethyl, propyl, butyl, pentyl, hexyl, octyl, decyl, hydroxyethyl, methoxyethyl or ethoxypropyl)-amino, anilino, sulphoanilino, morpholino, piperidino or pyrrolidino,
where the alkyl and alkoxy radicals may be straight-chain or branched, for example n-butyl, 2-butyl or tert-butyl, and may be partially or perfluorinated.

Particular preference is likewise given to light-absorbent compounds of the formulae (CCIX) to (CCXVIII),
in which
$R^{228}$ and $R^{229}$, independently of one another, are hydrogen, methyl, ethyl, propyl, butyl, methoxy, ethoxy, propoxy, butoxy, methoxyethoxy, phenoxy, methoxycarbonyl, ethoxycarbonyl or propoxycarbonyl,
$R^{230}$ and $R^{231}$ are cyano,
w is 1,
$R^{232}$ is phenyl or 4-chloro-pyrazol-1-yl,
$R^{233}$ is methoxy, 4-phenyl-5-methyl-1,2,3-triazol-2-yl, 4-ethyl-5-methyl-1,2,3-triazol-2-yl, dimethylamino or diethylamino,
$R^{234}$ and $R^{235}$ are hydrogen,
$R^{237}$ and $R^{243}$ are hydrogen,
$R^{238}$ is $SO_2$—NH—$(CH_2)_3$—$N(CH_3)_3{}^+An^-$,
$R^{239}$ is chlorine or bromine,
$R^{240}$ and $R^{241}$ are identical and are hydrogen, methyl or tert-butyl,
Z is O,
D is —CH=CH— or thiophene-2,5-diyl,
$R^{242}$ is CO—O-methyl, -ethyl or -butyl, and
z is 0,
W is N or CH,
$R^{244}$ and $R^{245}$, independently of one another, are methyl, ethyl, propyl, butyl, hydroxyethyl, methoxyethyl, ethoxypropyl, benzyl or phenylpropyl,
An$^-$ is an anion,
cat$^+$ is Na$^+$, Li$^+$, $NH_4{}^+$ or N(methyl, ethyl, propyl or butyl)$_4{}^+$,
E is CH or N, $R^{246}$ and $R^{247}$, independently of one another, are (methyl, ethyl, propyl, butyl, hydroxyethyl, methoxyethyl or ethoxypropyl)-amino, di(methyl, ethyl, propyl, butyl, hydroxyethyl, methoxyethyl or ethoxypropyl)-amino, anilino, morpholino, piperidino or pyrrolidino.

Very particular preference is likewise given to light-absorbent compounds of the formulae (CCIX), (CCX), (CCXII) and (CCXVII).

Preference is likewise given to light-absorbent compounds of the formulae (CCCI) to (CCCXV) in which $R^{300}$, $R^{301}$ and $R^{303}$, independently of one another, are hydrogen, methyl, ethyl, propyl, butyl, pentyl, hexyl, octyl, decyl, hydroxyethyl, methoxyethyl, ethoxypropyl, benzyl or phenylpropyl, m is an integer from 0 to 5, u is an integer from 1 to 2, where for u>1, the radicals may be different, $R^{302}$ is hydrogen, methyl, ethyl, propyl, butyl, pentyl, hexyl, octyl, decyl, hydroxyethyl, methoxyethyl, ethoxypropyl, benzyl or phenylpropyl, methoxycarbonyl, ethoxycarbonyl, propoxycarbonyl, butoxycarbonyl, pentoxycarbonyl, hexoxycarbonyl, octoxycarbonyl or decoxycarbonyl, $R^{304}$ is hydrogen, chlorine, cyano, nitro, methyl, ethyl, propyl, butyl, pentyl, hexyl, octyl, decyl, hydroxyethyl, methoxyethyl, ethoxypropyl, methoxy, ethoxy, propoxy, butoxy, pentoxy, hexoxy, octoxy, decoxy, methoxyethoxy, dimethylamino, diethylamino, dipropylamino, dibutylamino, N-methyl-N-cyanoethylamino, methoxycarbonyl, ethoxycarbonyl, propoxycarbonyl, butoxycarbonyl, pentoxycarbonyl, hexoxycarbonyl, octoxycarbonyl or decoxycarbonyl, $R^{305}$ is hydrogen, methyl, ethyl, propyl, butyl, hydroxyethyl, methoxyethyl, ethoxypropyl, benzyl or phenylpropyl, methoxy, ethoxy, propoxy, butoxy, methoxyethoxy, methoxycarbonyl, ethoxycarbonyl, propoxycarbonyl or butoxycarbonyl, $R^{306}$ and $R^{307}$, independently of one another, are hydrogen, methyl, ethyl, propyl, butyl, pentyl, hexyl, octyl, decyl, hydroxyethyl, methoxyethyl, ethoxypropyl, benzyl or phenylpropyl, phenyl, tolyl, methoxyphenyl or chlorophenyl, $R^{308}$ is methyl, ethyl, propyl, butyl, pentyl, hexyl, octyl, decyl, hydroxyethyl, methoxyethyl, ethoxypropyl, benzyl or phenylpropyl, methoxy, ethoxy, propoxy, butoxy, pentoxy, hexoxy, octoxy, decoxy, methoxyethoxy, methoxycarbonyl, ethoxycarbonyl, propoxycarbonyl, butoxycarbonyl, pentoxycarbonyl, hexoxycarbonyl, octoxycarbonyl, decoxycarbonyl, carboxyl, (methyl, ethyl, propyl, butyl, pentyl, hexyl, octyl, decyl, hydroxyethyl, methoxyethyl, ethoxypropyl, benzyl or phenylpropyl)-aminocarbonyl or di-(methyl, ethyl, propyl, butyl, pentyl, hexyl, octyl, decyl, hydroxyethyl, methoxyethyl, ethoxypropyl, benzyl or phenylpropyl)-aminocarbonyl, $R^{309}$ to $R^{314}$, independently of one another, are hydrogen, phenyl, tolyl, methoxyphenyl or chlorophenyl, carboxyl, cyano, methyl, ethyl, propyl, butyl, pentyl, hexyl, octyl, decyl, hydroxyethyl, methoxyethyl, ethoxypropyl, methoxy, ethoxy, propoxy, butoxy, pentoxy, hexoxy, octoxy, decoxy, methoxyethoxy, methoxycarbonyl, ethoxycarbonyl, propoxycarbonyl, butoxycarbonyl, pentoxycarbonyl, hexoxycarbonyl, octoxycarbonyl or decoxycarbonyl, $R^{315}$ and $R^{316}$, independently of one another, are carboxyl, methoxy, ethoxy, propoxy, butoxy, pentoxy, hexoxy, octoxy, decoxy, methoxyethoxy, methoxycarbonyl, ethoxycarbonyl, propoxycarbonyl, butoxycarbonyl, pentoxycarbonyl, hexoxycarbonyl, octoxycarbonyl, decoxycarbonyl or cyano, or $R^{315}$ and $R^{316}$, together with the carbon atom connecting them, are 5,5-dimethylcyclohexane-1,3-dion-2-ylidene, 5-phenylcyclohexane-1,3-dion-2-ylidene or 2,2-dimethyl-1,3-dioxane-4,6-dion-5-ylidene, $R^{317}$ to $R^{324}$, independently of one another, are hydrogen, hydroxyl, carboxyl, phenoxy, methyl, ethyl, propyl, butyl, pentyl, hexyl, octyl, decyl, hydroxyethyl, methoxyethyl, ethoxypropyl, methoxy, ethoxy, propoxy, butoxy, pentoxy, hexoxy, octoxy, decoxy, methoxyethoxy, methoxycarbonyl, ethoxycarbonyl, propoxycarbonyl, butoxycarbonyl, pentoxycarbonyl, hexoxycarbonyl, octoxycarbonyl, decoxycarbonyl or cyano, where the alkyl and alkoxy radicals may be straight-chain or branched, for example n-butyl, 2-butyl or tert-butyl, and may be partially or perfluorinated.

Particular preference is likewise given to light-absorbent compounds of the formulae (CCCI) to (CCCXV), in which $R^{300}$, $R^{301}$ and $R^{303}$, independently of one another, are hydrogen, methyl, ethyl, propyl, butyl, hydroxyethyl, methoxyethyl or ethoxypropyl, m is an integer from 3 to 5, u is 1, $R^{302}$ is hydrogen, methyl, ethyl, propyl, butyl, hydroxyethyl, methoxyethyl, ethoxypropyl, methoxycarbonyl, ethoxycarbonyl, propoxycarbonyl or butoxycarbonyl, $R^{304}$ is hydrogen, cyano, nitro, methyl, ethyl, propyl, butyl, pentyl, hexyl, hydroxyethyl, methoxyethyl, ethoxypropyl, methoxy, ethoxy, propoxy, butoxy, pentoxy, hexoxy, methoxyethoxy, dimethylamino, diethylamino, N-methyl-N-cyanoethylamino, methoxycarbonyl, ethoxycarbonyl, propoxycarbonyl, butoxycarbonyl, pentoxycarbonyl or hexoxycarbonyl, $R^{305}$ is hydrogen, methyl, ethyl, propyl, butyl, hydroxyethyl, methoxyethyl, ethoxypropyl, methoxy, ethoxy, propoxy, butoxy, methoxyethoxy, phenoxy, methoxycarbonyl, ethoxycarbonyl, propoxycarbonyl or butoxycarbonyl, $R^{306}$ and $R^{307}$, independently of one another, are hydrogen, methyl, ethyl, propyl, butyl, hydroxyethyl, methoxyethyl, ethoxypropyl, methoxycarbonyl, ethoxycarbonyl, propoxycarbonyl, butoxycarbonyl or phenyl, $R^{308}$ is methyl, ethyl, propyl, butyl, pentyl, hexyl, hydroxyethyl, methoxyethyl, ethoxypropyl, methoxy, ethoxy, propoxy, butoxy, pentoxy, hexoxy, methoxyethoxy, methoxycarbonyl, ethoxycarbonyl, propoxycarbonyl, butoxycarbonyl, pentoxycarbonyl, hexoxycarbonyl, (methyl, ethyl, propyl, butyl, pentyl, hexyl, hydroxyethyl, methoxyethyl or ethoxypropyl)-amino-carbonyl or di-(methyl, ethyl, propyl, butyl, pentyl, hexyl, hydroxyethyl, methoxyethyl or ethoxypropyl)-aminocarbonyl, $R^{309}$ to $R^{314}$, independently of one another, are hydrogen, phenyl, tolyl, methoxyphenyl, cyano, methyl, ethyl, propyl, butyl, pentyl, hexyl, hydroxyethyl, methoxyethyl, ethoxypropyl, methoxy, ethoxy, propoxy, butoxy, pentoxy, hexoxy, methoxyethoxy, methoxycarbonyl, ethoxycarbonyl, propoxycarbonyl, butoxycarbonyl, pentoxycarbonyl or hexoxycarbonyl, and where at least 2 of these radicals are hydrogen, $R^{315}$ and $R^{316}$, independently of one another, are methoxycarbonyl, ethoxycarbonyl, propoxycarbonyl, butoxycarbonyl or cyano, $R^{317}$ to $R^{324}$, independently of one another, are hydrogen, hydroxyl, methyl, ethyl, propyl, butyl, pentyl, methoxy, ethoxy, propoxy, butoxy, pentoxy, hexoxy, octoxy, decoxy, methoxyethoxy, phenoxy, methoxycarbonyl, ethoxycarbonyl, propoxycarbonyl, butoxycarbonyl, pentoxycarbonyl or cyano, and where at least 4 radicals are hydrogen and at least one of the radicals $R^{318}$ and $R^{312}$ is methoxy, ethoxy, propoxy, butoxy, pentoxy, hexoxy, octoxy, decoxy, methoxyethoxy or phenoxy.

Very particular preference is likewise given to light-absorbent compounds of the formulae (CCCI) to (CCCIV), (CCCXI) and (CCCIX).

Preference is likewise given to light-absorbent compounds of the formulae (CDI) to (CDXIX) in which $R^{400}$ is hydrogen, methyl, ethyl, propyl, butyl, pentyl, hexyl, octyl, decyl, hydroxyethyl, methoxyethyl, ethoxypropyl, benzyl, methoxy, ethoxy, propoxy, butoxy, pentoxy, hexoxy, octoxy, decoxy or methoxyethoxy, t is an integer from 1 to 2, where for t>1, the radicals may be different, $R^{401}$ and $R^{402}$, independently of one another, are hydrogen, methyl, ethyl, propyl, butyl, pentyl, hexyl, octyl, decyl, hydroxyethyl, methoxyethyl, ethoxypropyl, benzyl or phenylpropyl, $R^{403}$ is hydrogen, phenyl, tolyl, methoxyphenyl, methyl, ethyl, propyl, butyl, pentyl, hexyl, octyl, decyl, hydroxyethyl, methoxyethyl, ethoxypropyl, benzyl or phenylpropyl, $R^{404}$ and $R^{405}$, independently of one another, are methyl, ethyl, propyl, butyl, pentyl, hexyl, octyl, decyl, hydroxyethyl, methoxyethyl, ethoxypropyl, benzyl, phenylpropyl, phenyl, tolyl or methoxyphenyl, or $NR^{404}R^{405}$ is morpholino, piperidino or pyrrolidino, $R^{406}$ is hydrogen, cyano, nitro, carboxyl, methyl, ethyl, propyl, butyl, pentyl, hexyl, octyl, decyl, hydroxyethyl, methoxyethyl, ethoxypropyl, benzyl or phenylpropyl, methoxy, ethoxy, propoxy, butoxy, pentoxy, hexoxy, octoxy, decoxy, methoxyethoxy, methoxycarbonyl, ethoxycarbonyl, propoxycarbonyl, butoxycarbonyl, pentoxycarbonyl, hexoxycarbonyl, octoxycarbonyl or decoxycarbonyl, $R^{407}$ and $R^{408}$, independently of one another, are hydrogen methyl, ethyl, propyl, butyl, pentyl, hexyl, octyl, decyl, hydroxyethyl, methoxyethyl, ethoxypropyl, benzyl or phenylpropyl, where the alkyl and alkoxy radicals may be straight-chain or branched, for example n-butyl, 2-butyl or tert-butyl, and may be partially or perfluorinated.

Particular preference is likewise given to light-absorbent compounds of the formulae (CDI) to (CDXIX) in which $R^{400}$ is hydrogen, methyl, ethyl, propyl, butyl, pentyl, hexyl, hydroxyethyl, methoxyethyl, ethoxypropyl, benzyl, methoxy, ethoxy, propoxy, butoxy, pentoxy, hexoxy or methoxyethoxy, t is 1, $R^{401}$ and $R^{402}$, independently of one another, are hydrogen, methyl, ethyl, propyl, butyl, hydroxyethyl, methoxyethyl or ethoxypropyl, $R^{403}$ is hydrogen, phenyl, tolyl, methoxyphenyl, methyl, ethyl, propyl, butyl, hydroxyethyl, methoxyethyl or ethoxypropyl, $R^{404}$ and $R^{405}$, independently of one another, are methyl, ethyl, propyl, butyl, hydroxyethyl, methoxyethyl, ethoxypropyl, benzyl or phenyl, $R^{406}$ is hydrogen, cyano, nitro, methyl, ethyl, propyl, butyl, pentyl, hexyl, hydroxyethyl, methoxyethyl, ethoxypropyl, methoxy, ethoxy, propoxy, butoxy, pentoxy, hexoxy, methoxyethoxy, methoxycarbonyl, ethoxycarbonyl, propoxycarbonyl, butoxycarbonyl, pentoxycarbonyl or hexoxycarbonyl, $R^{407}$ and $R^{408}$, independently of one another, are hydrogen methyl, ethyl, propyl, butyl, pentyl, hexyl, hydroxyethyl, methoxyethyl, ethoxypropyl, benzyl or phenylpropyl.

Very particular preference is likewise given to light-absorbent compounds of the formulae (CDI), (CDVI), (CDVII), (CDVIII), (CDXII) and (CDXVII).

Mixtures of the abovementioned light-absorbent compounds can likewise be employed, for example in order to adapt the spectral properties and/or in particular in order to optimize the film-forming properties.

For example, a mixture comprising 75% of the compound of the formula

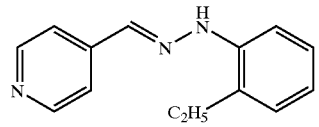

and 25% of the compound of the formula

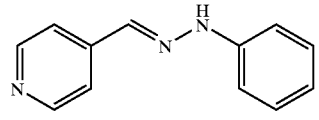

gives a more amorphous film than that of the two components individually.

For example, a mixture comprising 50% of the compound of the formula

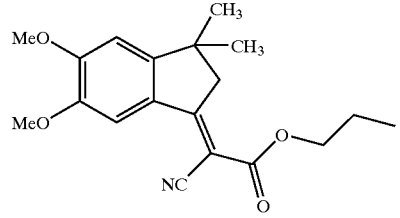

and 50% of the compound of the formula

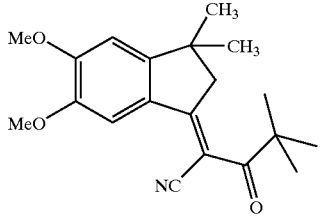

gives a more stable amorphous film than the individual components.

The write-once optical data carriers according to the invention can be produced, for example, by spin coating of the light-absorbent compounds themselves or in combination with other light-absorbent compounds or with suitable solvents onto a transparent substrate. The substrate may have already been provided in advance with a reflection layer produced by sputtering or vapor deposition. For the coating, the light-absorbent compound is preferably dissolved in a suitable solvent or solvent mixture, with or without additives, so that the light-absorbent compound makes up 100 or less parts by weight based on 100 parts by weight of solvent. This primary solution can subsequently be diluted with a further suitable solvent, so that the light-absorbent compound makes up 20 or less parts by weight per 100 parts by weight of solvent. The writeable information layer is then, if desired, metallized, either under reduced pressure by sputtering or vapor deposition and subsequently provided with a protective lacquer or instead of a protective lacquer, is bonded to a second substrate or, if desired, to an interlayer and a cover layer.

For example, 3 parts of the compound of the formula

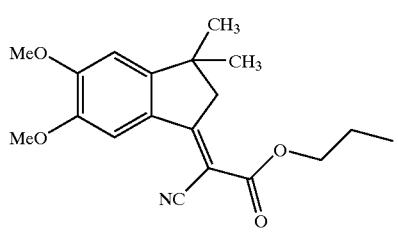

and 3 parts of the compound of the formula

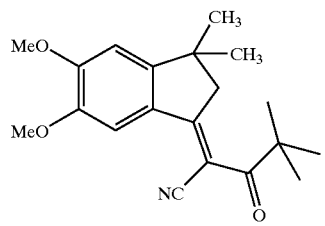

were dissolved in 94 parts of 1-butanol at room temperature. The solution was applied by spin coating to a polycarbonate substrate disk with a thickness of 1.2 nm and a radius of 60 mm, and formed an amorphous film thereon. The layer was then metallized by vapor-deposition of a silver layer with a thickness of 50 nm.

EXAMPLES

| | $\lambda_{max1}$ | $\lambda_{1/2}$ | $\lambda_{1/10}$ | $\epsilon$ |
|---|---|---|---|---|
| | 387 in toluene | 420 | 443 | 28038 |
| | 388 in toluene | 423 | 444 | |
| | 383 in toluene | 410 | 435 | |
| | 395 in toluene | 425 | 457 | 34480 |
| | 346 in methylene chloride | 385 | 410 | |

| | λ<sub>max1</sub> | λ<sub>1/2</sub> | λ<sub>1/10</sub> | ε |
|---|---|---|---|---|
| [structure: 3-(4-methoxybenzylidene)benzofuran-2(3H)-one] | 373 in methylene chloride | 404 | 425 | |
| [structure: 3-(2,4,5-trimethylbenzylidene)benzofuran-2(3H)-one] | 371 in dioxane | 404 | 423 | 12830 |
| [structure: 3-(furan-2-ylmethylene)benzofuran-2(3H)-one] | 355 in dioxane | 387 | 409 | 16700 |
| [structure: bis-amide azo compound with OMe] | 386 in dimethylformamide | 422 | 478 | |
| [structure: bis-amide azo compound with OMe] | 374 in dimethylformamide | 407 | 453 | 32290 |

-continued
| | $\lambda_{max1}$ | $\lambda_{1/2}$ | $\lambda_{1/10}$ | $\epsilon$ |
|---|---|---|---|---|
| 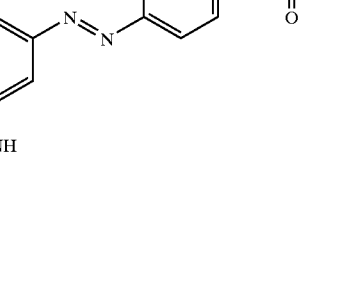 | 373 in dimethyl-formamide | 405 | 440 | 32370 |
| 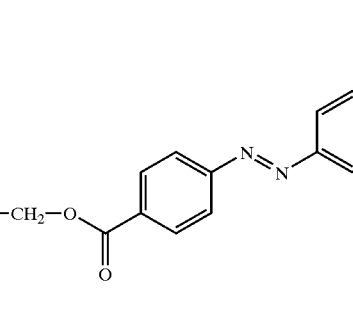 | 344 in dimethyl-formamide | 363 | 375 | 22960 |
| 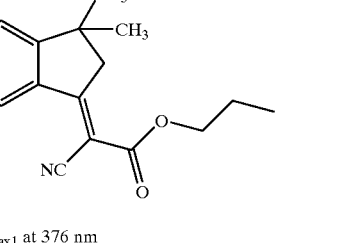 | 363/376 in dioxane | 390* | 399* | 25200 |
| *based on $\lambda_{max1}$ at 376 nm | | | | |
| 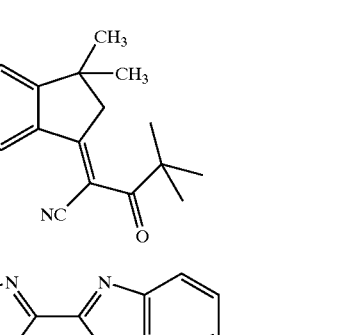 | 372 in dioxane | 399 | 411 | 22330 |
| 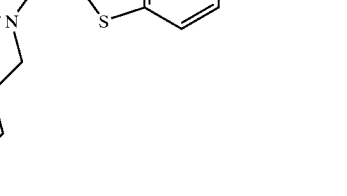 | 342/360 in dioxane | 366* | 371* | 24067 |
| *based on $\lambda_{max1}$ at 360 nm | | | | |

| | $\lambda_{max1}$ | $\lambda_{1/2}$ | $\lambda_{1/10}$ | $\epsilon$ |
|---|---|---|---|---|
| 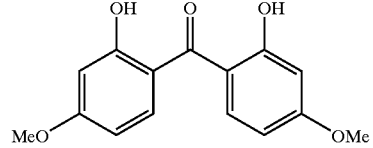 | 346 in methanol | 384 | 407 | |
| 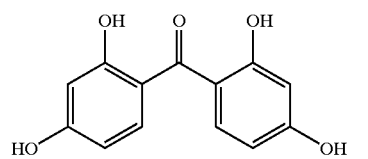 | 347 in methanol | 387 | 407 | |
| 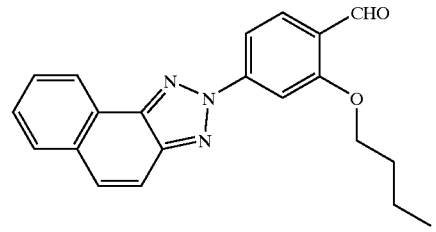<br>based on $\lambda_{max1}$ at 373 nm | 356/373 in dimethyl-formamide | 381 | 387* | 32600 |
| 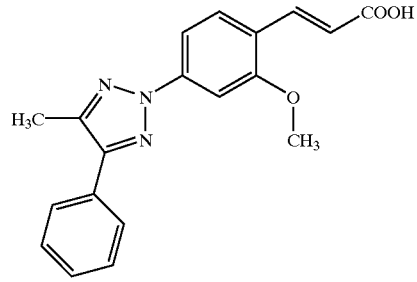 | 345 in dimethyl-formamide | 367 | 380 | 31300 |
| 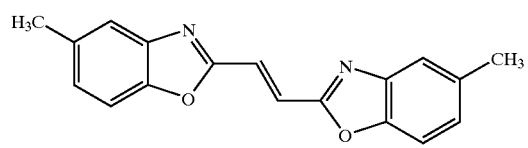 | 360 in dimethyl-formamide | 387 | 394 | 40160 |
| 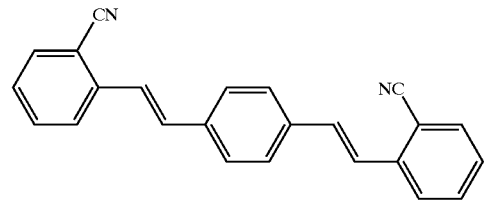 | 362 in dimethyl-formamide | 388 | 400 | 43560 |

-continued

| | $\lambda_{max1}$ | $\lambda_{1/2}$ | $\lambda_{1/10}$ | $\epsilon$ |
|---|---|---|---|---|
| [structure: coumarin with chloropyrazole and methyl-phenyl-triazole substituents] | 367 in dimethylformamide | 392 | 404 | 46806 |
| [structure: coumarin with methyl-triazolium and ethyl-methyl-triazole substituents] CH₃OSO₃⁻ | 361 in dimethylformamide | 390 | 408 | 33504 |
| [structure: bis(3-methylbenzothiazol-2-ylidene)amine] BF₄⁻ | 375 in methanol | 386 | 393 | |
| [structure: methoxybenzofuran linked to dimethylbenzimidazolium with methylsulfonyl group] C₁₄/₁₅H₂₉/₃₁SO₃⁻ | 365 in methanol | 390 | 405 | 39340 |
| [structure: methyl/ethylhexyl benzimidazolium linked to benzothiazole] CH₃OSO₃⁻ | | | | |
| [structure: pyridine-4-carbaldehyde phenylhydrazone] | 355 in dioxane | 380 | 396 | 24880 |

-continued
| Structure | $\lambda_{max1}$ | $\lambda_{1/2}$ | $\lambda_{1/10}$ | $\epsilon$ |
|---|---|---|---|---|
| 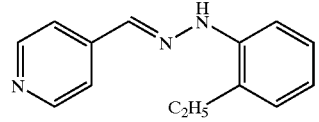 | 356 in dioxane | 383 | 402 | |
| 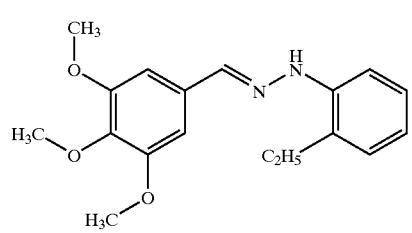 | 347 in dioxane | 372 | 388 | 23360 |
| 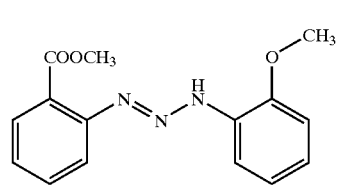 | 370 in dioxane | 400 | 419 | 21720 |
| 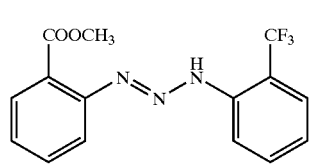 | 360 in dioxane | 390 | 409 | |
| 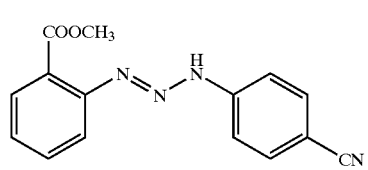 | 370 in dioxane | 399 | 420 | 28200 |
| 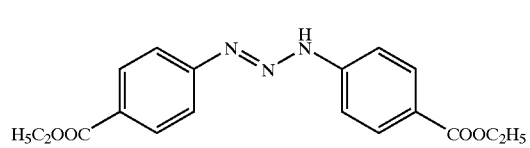 | 371 in dioxane | 401 | 421 | |
| 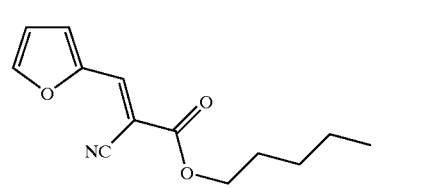 | 363 in dioxane | 383 | 394 | |
| 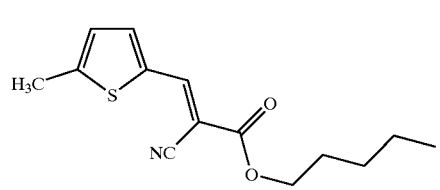 | 354 in dioxane | 378 | 392 | |

-continued

| | $\lambda_{max1}$ | $\lambda_{1/2}$ | $\lambda_{1/10}$ | $\epsilon$ |
|---|---|---|---|---|
| [structure: 3,4,5-trimethoxyphenyl cyanoacrylate 2-ethylhexyl ester] | 349 in dioxane | 377 | 395 | |
| [structure: 4-(dimethylamino)benzylidene dimethyl succinate] | 341 in dioxane | 369 | 384 | 20905 |
| [structure: indol-3-yl acrylonitrile] | | | | |
| [structure: pyrrol-2-yl α-phenyl acrylonitrile] | 361 in dioxane | 386 | 401 | 29680 |
| [structure: pyridin-4-yl benzothiazol-2-yl acrylonitrile] | 343 in dioxane | 374 | 395 | |
| [structure: benzothiazol-2-yl methylene 4-isopropylaniline] | 355 in dioxane | 383 | 403 | |
| [structure: N-methyl benzothiazol-2-ylidene hydrazone of 2-ethoxybenzaldehyde] | 363 in dioxane | 390 | 400 | 28256 |
| [structure: dimethyl 4,5-bis(methoxycarbonyl)-1,3-dithiol-2-ylidene-2,2-dimethyl-1,3-dioxane-4,6-dione] | 363 in dioxane | 372 | 382 | |

-continued

| | λ_{max1} | λ_{1/2} | λ_{1/10} | ε |
|---|---|---|---|---|
| 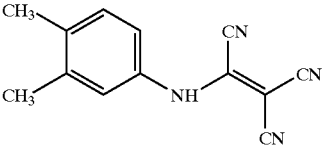 | 349 in dioxane | 389 | 422 | |
| 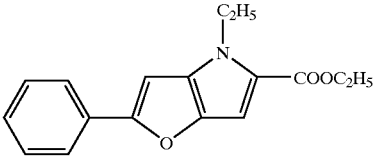 | 355 in dioxane | 361 | 365 | 45450 |
| 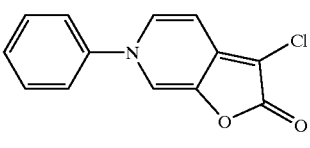 | 368 in dioxane | 392 | 400 | 31770 |
| 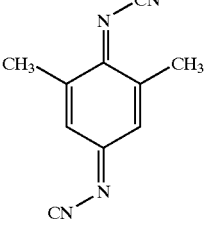 | 342 in dioxane | 374 | 405 | 287800 |
| 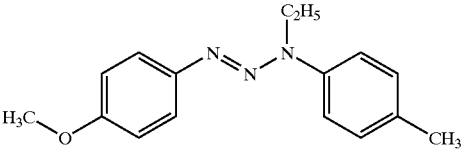 | 358 in dioxane | 387 | 407 | 21710 |
| 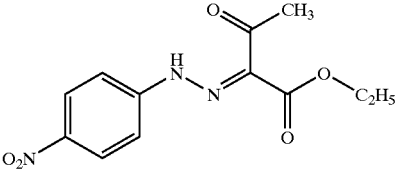 | 372 in dioxane | 400 | 420 | 31440 |

The information layer may, besides the light-absorbent compound, also comprise binders, wetting agents, stabilizers, diluents and stabilizers as well as further constituents.

The substrates may have been produced from optically transparent plastics which, if necessary, have been subjected to surface treatments. Preferred plastics are polycarbonates and polyacrylates, and polycycloolefins or polyolefins. The light-absorbent compound can, in low concentration, also be employed for the protection of the polymer substrate and for light stabilization thereof.

The reflection layer can be produced from any metal or metal alloy which is usually used for writeable optical data carriers. Suitable metals or metal alloys can be applied by vapor deposition and sputtering and comprise, for example, gold, silver, copper, aluminum and alloys thereof, with one another or with other metals.

The protective lacquer over the reflection layer can consist of UV-curing acrylates.

An interlayer which protects the reflection layer against oxidation may likewise be present.

Mixtures of the abovementioned light-absorbent compounds can likewise be employed.

The invention furthermore relates to a process for the production of the optical data carriers according to the invention, which is characterized in that a preferably transparent substrate which has, if desired, been provided in advance with a reflection layer, is coated with the light-absorbent compound in combination with suitable binders and, if desired, suitable solvents, and, if desired, provided with a reflection layer, further interlayers and, if desired, a protective layer or a further substrate or a cover layer.

Coating of the substrate with the light-absorbing compound, if desired in combination with dyes, binders and/or solvents, is preferably carried out by spin coating.

For the coating, the light-absorbent compound is preferably dissolved in a suitable solvent or solvent mixture, with or without additives, so that the UV absorber makes up 100 or less, for example from 10 to 2 parts by weight per 100 parts by weight of solvent. The writeable information layer is then preferably metallized under reduced pressure by sputtering or vapor deposition (reflection layer) and possibly subsequently provided with a protective lacquer (protective layer) or a further substrate or a cover layer. Multilayer arrangements with partially transparent reflection layer are also possible.

Solvents or solvent mixtures for the coating of the light-absorbent compounds or their mixtures with additives and/or binders are selected firstly on the basis of their dissolution capacity for the light-absorbent compound and the other additives, and secondly on the basis of minimum effect on the substrate. Suitable solvents which have a low effect on the substrate are, for example, alcohols, ethers, hydrocarbons, halogenated hydrocarbons, Cellosolve and ketones. Examples of such solvents are methanol, ethanol, propanol, 2,2,3,3-tetrafluoropropanol, butanol, diacetone alcohol, benzyl alcohol, tetrachloroethane, dichloromethane, diethyl ether, dipropyl ether, dibutyl ether, methyl tert-butyl ether, methylcellosolve, ethylcellosolve, 1-methyl-2-propanol, methyl ethyl ketone, 4-hydroxy-4-methyl-2-pentanone, hexane, cyclohexane, ethylcyclohexane, octane, benzene, toluene and xylene. Preferred solvents are hydrocarbons and alcohols, since they exert the least influence on the substrate.

Suitable additives for the writeable information layer are stabilizers, wetting agents, binders, diluents and sensitizers.

What is claimed is:

1. Optical data carrier comprising a preferably transparent substrate, which has optionally already been coated with a reflection layer and to whose surface a light-writeable information layer, if desired a reflection layer and/or if desired a protective layer or a further substrate or a cover layer have been applied and which can be written and read by means of blue light, preferably laser light, where the information layer comprises a light-absorbent compound and, if desired, a binder, characterized in that the light-absorbent compound has an absorption maximum $\lambda_{max1}$ of from 340 to 410 nm and the wavelength $\lambda_{1/2}$, at which the absorbance on the long-wave edge of the absorption maximum of the wavelength $\lambda_{max1}$ is half the absorbance value at $\lambda_{max1}$, and the wavelength $\lambda_{1/10}$, at which the absorbance on the long-wave edge of the absorption maximum of the wavelength $\lambda_{max1}$ is a tenth of the absorbance value at $\lambda_{max1}$, are both jointly in the range from 370 to 460 nm.

2. Optical data carrier according to claim 1, characterized in that the light-absorbent compound has no further absorption maximum $\lambda_{max2}$ in the region of wavelengths longer than $\lambda_{max1}$ to a wavelength of 500 nm.

3. Optical data carrier according to claim 1, characterized in that the light-absorbent compound has further, preferably strong absorptions and absorption maxima in the region of wavelengths shorter than $\lambda_{max1}$.

4. Optical data carrier according to claim 1, characterized in that the molar absorption coefficient ε of the light-absorbent claim is >10 000 l/mol cm at the absorption maximum $\lambda_{max1}$.

5. Optical data carrier according to claim 1, characterized in that the light-absorbent compound is one of the following compounds:

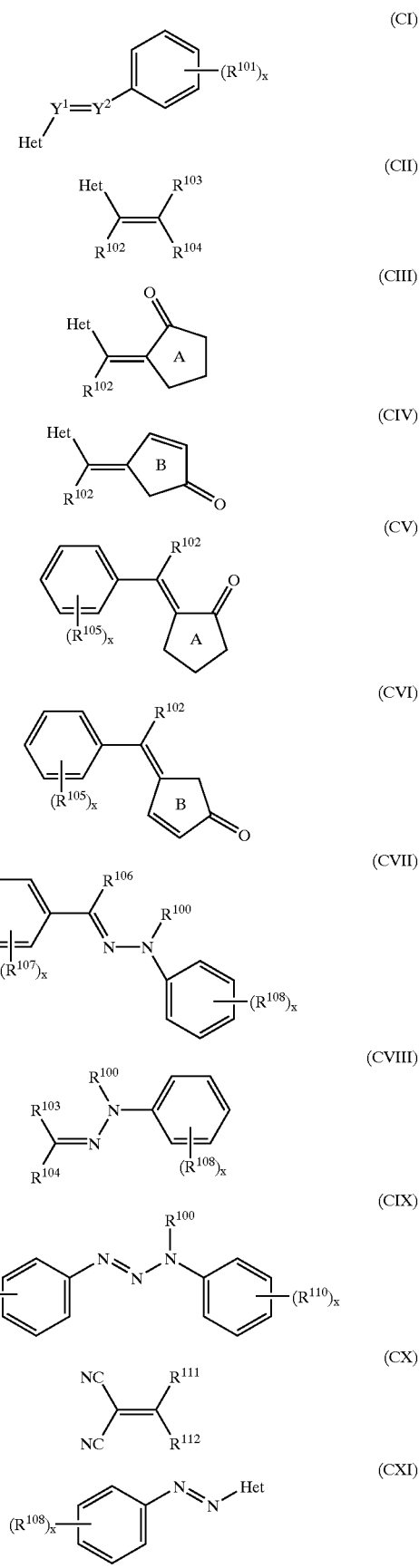

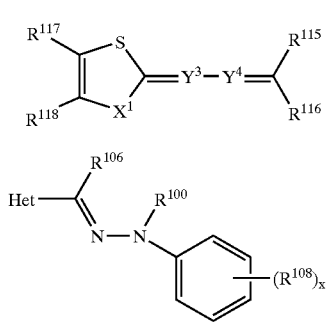

in which

R$^{100}$ is hydrogen or C$_1$- to C$_4$-alkyl x is an integer from 1 to 3 and where for x>1, the radicals may be different, R$^{101}$ is hydrogen, halogen, nitro, C$_1$- to C$_{16}$-alkyl, C$_1$- to C$_{16}$-alkoxy, cyano, carboxyl or C$_1$- to C$_{16}$-alkoxycarbonyl, Y$^1$ and Y$^2$, independently of one another, are C—R$^{102}$ and Y$^1$ or Y$^2$ may additionally be N, R$^{102}$ is hydrogen, C$_6$- to C$_{10}$-aryl, C$_1$- to C$_{16}$-alkyl, cyano, carboxyl, C$_1$- to C$_{16}$-alkoxycarbonyl, C$_1$- to C$_{16}$-alkanoyl, Het is benzothiazol-2-yl, benzoxazol-2-yl, benzimidazol-2-yl, thiazol-2-yl, 1,3,4-thiadiazol-2-yl, 2- or 4-pyridyl, 2- or 4-quinolyl or 3,3-dimethylindolen-2-yl, each of which may be substituted by methyl, ethyl, methoxy, ethoxy, chlorine, bromine, iodine, cyano, nitro, methoxycarbonyl, methylthio, dimethylamino, diethylamino or dipropylamino, and each of which may optionally be quaternized on the nitrogen by alkyl or (C$_2$H$_4$O)$_n$H, where n=1–16, and contain alkylSO$_3$$^-$, alkoxySO$_3$$^-$ or halogen as counterion, or is furan-2- or -3-yl, thiophen-2- or -3-yl, pyrrol-2- or -3-yl, N-alkylpyrrol-2- or -3-yl, each of which may be substituted by methyl, ethyl, methoxy, ethoxy, chlorine, cyano, nitro, methoxycarbonyl, methylthio, dimethylamino, diethylamino or dipropylamino and/or may be benzo-fused, R$^{103}$ and R$^{104}$, independently of one another, are cyano, carboxyl, C$_1$- to C$_{16}$-alkoxycarbonyl, aminocarbonyl or C$_1$- to C$_{16}$-alkanoyl, or R$^{104}$ is hydrogen, CH$_2$—COOalkyl or P(O)(O—C$_1$- to C$_{12}$-alkyl)$_2$ or C$_1$- to C$_{16}$-alkyl A is a five- or six-membered carbocyclic or heterocyclic ring, which may be benzo-fused, B is a five- or six-membered carbocyclic or heterocyclic ring, which may be benzo-fused, R$^{105}$ is hydrogen, halogen, C$_1$- to C$_{16}$-alkyl, C$_1$- to C$_{16}$-alkoxy, cyano, nitro, carboxyl or C$_1$- to C$_{16}$-alkoxycarbonyl, R$^{106}$ is hydrogen, C$_1$- to C$_4$-alkyl, C$_1$- to C$_{16}$-alkoxycarbonyl or cyano, R$^{107}$ is hydrogen, halogen, C$_1$- to C$_{16}$-alkyl, C$_1$- to C$_{16}$-alkoxy, nitro, cyano or C$_1$- to C$_{16}$-alkoxycarbonyl, R$^{108}$ is hydrogen, nitro, cyano, halogen, C$_1$- to C$_{16}$-alkyl, carboxyl, C$_1$- to C$_{16}$-alkoxycarbonyl or C$_1$- to C$_{16}$-alkoxy, R$^{109}$ and R$^{110}$, independently of one another, are hydrogen, cyano, nitro, halogen, carboxyl, C$_1$- to C$_{16}$-alkoxycarbonyl or C$_1$- to C$_{16}$-alkanoyl, C$_1$- to C$_{16}$-alkyl or C$_1$- to C$_{16}$-alkoxy, R$^{111}$ is cyano, CH=CH—NR$^{113}$R$^{114}$, R$^{112}$ is hydrogen, anilino, N—C$_1$- to C$_{16}$-alkylanilino or N=CH—NR$^{113}$R$^{114}$ or R$^{111}$ and R$^{112}$ are =C=C—NR$^{113}$R$^{114}$, R$^{113}$ and R$^{114}$, independently of one another, are hydrogen, C$_1$- to C$_{16}$-alkyl, X$^1$ is S or N—R$^{100}$, =Y$^3$—Y$^4$= is a direct double bond or is =N—N=, R$^{115}$ and R$^{116}$, independently of one another, are cyano, carboxyl, C$_1$- to C$_{16}$-alkoxycarbonyl, aminocarbonyl, P(O)(O—C$_1$- to C$_{12}$-alkyl)$_2$ or C$_1$- to C$_{16}$-alkanoyl, or R$^{115}$ and R$^{116}$, together with the carbon atom connecting them, form a carbocyclic or heterocyclic, optionally benzo-fused five- or six-membered ring, R$^{117}$ and R$^{118}$, independently of one another, are hydrogen, C$_1$- to C$_{16}$-alkyl, cyano, SCOC$_6$- to C$_{10}$-aryl, carboxyl, C$_1$- to C$_{16}$-alkoxycarbonyl or C$_1$- to C$_{16}$-alkanoyl or together are a —CH=CH—CH=CH— bridge, where the alkyl, alkoxy, aryl and heterocyclic radicals may optionally carry further radicals, such as alkyl, halogen, nitro, cyano, CO—NH$_2$ alkoxy, trialkylsilyl, trialkylsiloxy, or phenyl, the alkyl and alkoxy radicals may be straight chain or branched, the alkyl radicals may be partially or perhalogenated, the alkyl and alkoxy radicals may be ethoxylated or propoxylated or silylated, adjacent alkyl and/or alkoxy radicals on aryl or heterocyclic radicals may jointly form a three- or four-membered bridge, and the heterocyclic radicals may be benzo-fused.

6. Optical data carrier according to claim 1, characterized in that the light-absorbent compound is one of the following compounds:

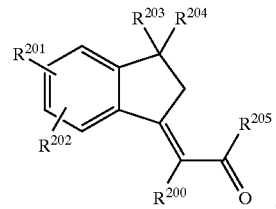

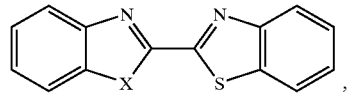

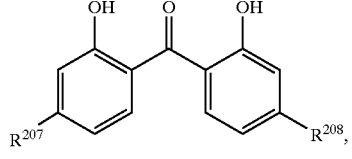

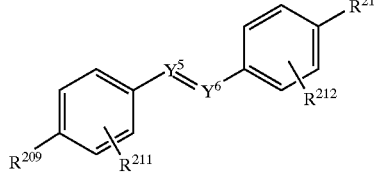

-continued

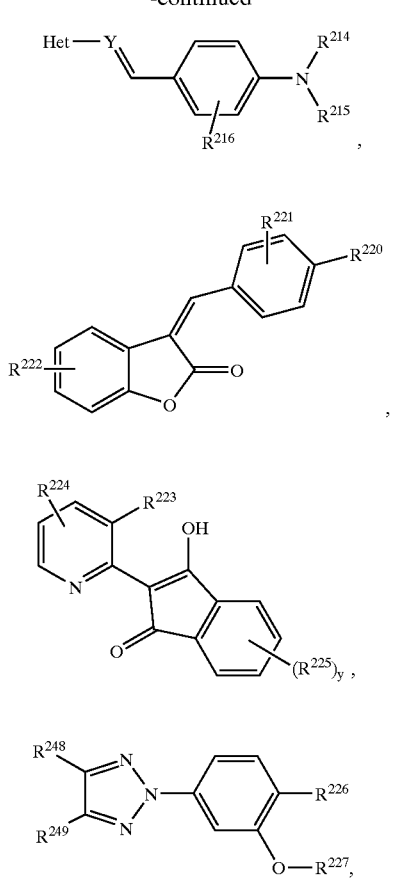

in which
- $R^{200}$ is cyano, $C_6$- to $C_{10}$ aryl or $C_1$- to $C_{16}$-alkoxycarbonyl,
- $R^{201}$ and $R^{202}$, independently of one another, are hydrogen, halogen, $C_1$- to $C_{16}$-alkyl, $C_1$- to $C_{16}$-alkoxy, or
- $R^{201}$ and $R^{202}$, if they are in the o-position to one another, may form a three- or four-membered bridge, preferably such as —O—CH$_2$—O—, —O—CF$_2$—O—, —O—(CH$_2$)$_2$—O—, —O—(CH$_2$)$_2$—,
- $R^{203}$ and $R^{204}$, independently of one another, are hydrogen or $C_1$- to $C_{16}$-alkyl,
- $R^{205}$ is $C_1$- to $C_{16}$-alkyl, $C_1$- to $C_{16}$-alkoxy, $C_1$ to $C_{16}$-mono- or dialkylamino, or
- $R^{205}$ is a divalent radical, such as —O(CH$_2$)$_n$—O—, —O(CH$_2$CH$_2$O)$_n$— or —O(CH$_2$(CHCH$_3$)O)$_n$— which connects two radicals of the formula (CCI) to one another,
- n is an integer from 1 to 16, or
- $R^{200}$ and $R^{205}$ together may form a three- or four-membered bridge, preferably such as —(CO)—(CH$_2$)$_3$—, —(CO)—CH$_2$—C(CH$_3$)$_2$—CH$_2$—, —(CO)—O—C(CH$_3$)$_2$—O— or —(CO)-o-C$_6$H$_4$—,
- X is S or N—$R^{206}$,
- $R^{206}$ and $R^{227}$, independently of one another, are $C_1$- to $C_{16}$-alkyl,
- $R^{207}$ and $R^{208}$, independently of one another, are hydroxyl, $C_1$- to $C_{16}$-alkoxy or $C_6$- to $C_{10}$-aryloxy,
- $R^{209}$ and $R^{210}$, independently of one another, are $C_1$- to $C_{16}$-alkoxy, $C_1$- to $C_{16}$-alkylthio, NR$^{217}$R$^{218}$, $C_6$- to $C_{16}$-aryloxy, cyano, CO—OR$^{217}$, CO—NR$^{217}$R$^{218}$, NR$^{218}$—CO—R$^{219}$, NR$^{218}$—SO$_2$—R$^{219}$, and
- $R^{209}$ is additionally hydrogen or $C_1$- to $C_{16}$-alkyl,
- $R^{211}$ and $R^{212}$, independently of one another, are hydrogen, halogen, $C_1$- to $C_{16}$-alkyl, $C_1$- to $C_{16}$-alkoxy or NR$^{218}$—CO—R$^{219}$,
- Het is benzothiazol-2-yl, benzoxazol-2-yl, benzimidazol-2-yl, thiazol-2-yl, 1,3,4-thiadiazol-2-yl, 2- or 4-pyridyl, 2- or 4-quinolyl, pyrrol-2- or -3-yl, thiophen-2- or -3-yl, furan-2- or -3-yl, indol-2- or -3-yl, benzothiophen-2-yl, benzofuran-2-yl or 3,3-dimethylindolen-2-yl, which may be substituted by methyl, ethyl, methoxy, ethoxy, chlorine, cyano, nitro, methoxycarbonyl, methylthio, dimethylamino, diethylamino or dipropylamino,
- Y, $Y^5$ and $Y^6$, independently of one another, are N or C—$R^{213}$,
- $R^{213}$ is hydrogen, $C_1$- to $C_4$-alkyl, cyano, CO—$R^{219}$, CO—O—$R^{217}$ or CO—NR$^{217}$R$^{218}$,
- $R^{214}$ and $R^{215}$, independently of one another, are hydrogen, $C_1$- to $C_{16}$-alkyl, CO—$R^{219}$ or $C_6$- to $C_{10}$-aryl, or
- NR$^{214}$R$^{215}$ is pyrrolidino, piperidino or morpholino,
- $R^{216}$ is hydrogen, halogen, $C_1$- to $C_{16}$-alkyl, $C_1$- to $C_{16}$-alkoxy or NH—CO—$R^{219}$,
- $R^{217}$ and $R^{218}$, independently of one another, are hydrogen, $C_1$- to $C_{16}$-alkyl or $C_6$- to $C_{10}$-aryl,
- $R^{219}$ is $C_1$- to $C_{16}$-alkyl or $C_6$- to $C_{10}$-aryl,
- $R^{220}$ to $R^{222}$, independently of one another, are hydrogen, $C_1$- to $C_{16}$-alkyl or $C_1$- to $C_{16}$-alkoxy, where
- $R^{220}$ and $R^{221}$, if they are in the o-position to one another, may jointly form an —O—CH$_2$—O—, —O—CF$_2$—O—, —O—(CH$_2$)$_2$—O— or —O—(CH$_2$)$_2$— bridge,
- $R^{223}$ is hydrogen or hydroxyl,
- $R^{224}$ is hydrogen, halogen or $C_1$- to $C_{16}$-alkyl,
- $R^{225}$ is hydrogen or halogen,
- y is integer from 1 to 4,
- $R^{226}$ is CHO, CN, CO—$C_1$- to $C_8$-alkyl, CO—$C_6$- to $C_{10}$-aryl or CH=C(CO—$C_1$- to $C_8$-alkyl)-CH$_2$—CO—$C_1$- to $C_8$-alkyl, and
- $R^{248}$ and $R^{249}$, independently of one another, are hydrogen, $C_1$- to $C_{16}$-alkyl or $C_6$- to $C_{10}$-aryl or together are a —CH=CH—CH=CH— or o-$C_6$H$_4$—CH=CH—CH=CH— bridge, where the alkyl, alkoxy, aryl and heterocyclic radicals may optionally carry further radicals, such as alkyl, halogen, nitro, cyano, CO—NH$_2$, alkoxy, trialkylsilyl, trialkylsiloxy or phenyl, the alkyl and alkoxy radicals may be straight-chain or branched, the alkyl radicals may be partially or perhalogenated, the alkyl and alkoxy radicals may be ethoxylated or propoxylated or silylated, adjacent alkyl and/or alkoxy radicals on aryl or heterocyclic radicals may jointly form a three- or four-membered bridge, and the heterocyclic radicals may be benzo-fused.

7. Optical data carrier according to claim 1, characterized in that the light-absorbent compound is one of the following compounds:

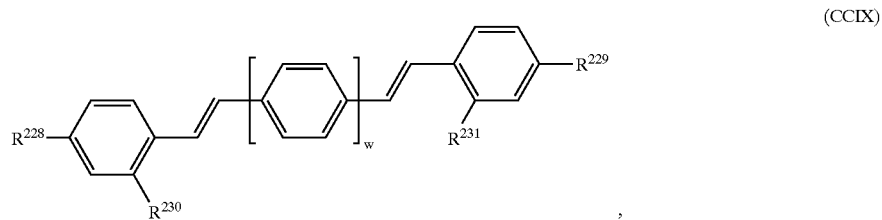
(CCIX)
(CCX)
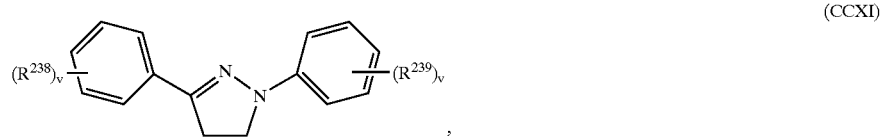
(CCXI)
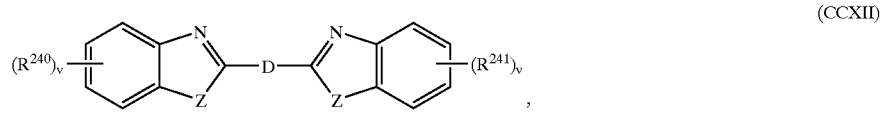
(CCXII)
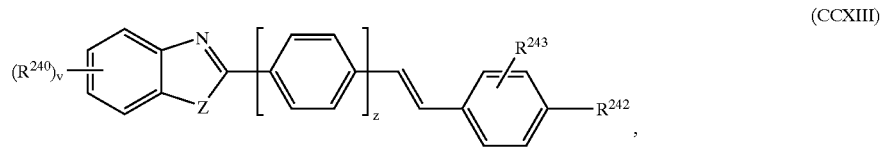
(CCXIII)
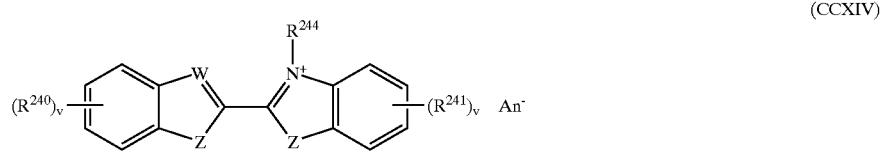
(CCXIV)
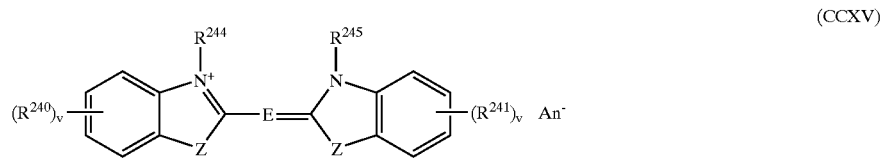
(CCXV)
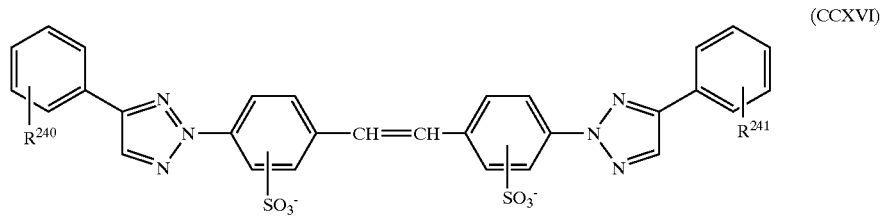
(CCXVI)
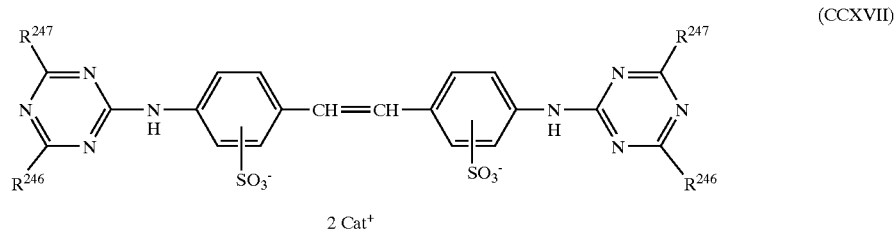
(CCXVII)

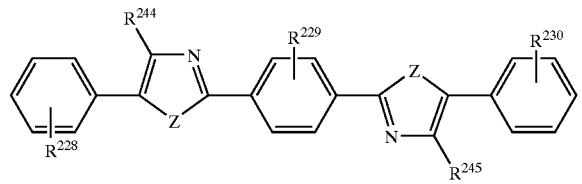

in which
- $R^{229}$ to $R^{231}$, independently of one another, are hydrogen, halogen, cyano, $C_1$- to $C_{16}$-alkyl, $C_1$- to $C_{16}$-alkoxy or $C_1$- to $C_{16}$-alkoxycarbonyl,
- w is 1 or 2,
- $R^{232}$ is hydrogen, cyano, CO—O—$C_1$- to $C_4$-alkyl, $C_6$- to $C_{10}$-aryl, thiophen-2-yl, pyrid-2- or 4-yl, pyrazol-1-yl or 1,2,4-triazol-1- or -4-yl,
- $R^{233}$ is hydrogen, $C_1$- to $C_{16}$-alkoxy, 1,2,3-triazol-2-yl or di-$C_1$- to $C_{16}$-alkylamino,
- $R^{234}$ and $R^{235}$ are hydrogen or together are a —CH=CH—CH=CH— bridge,
- $R^{237}$ is hydrogen, $C_1$- to $C_{16}$-alkyl or cyano,
- $R^{238}$ and $R^{239}$, independently of one another, are hydrogen, halogen, CO—$C_1$- to $C_{16}$-alkyl, $SO_2$—$C_1$- to $C_{16}$-alkyl or $SO_2$—NH—$C_1$- to $C_{16}$-alkylA$^+$ An$^-$,
- A$^+$ is N($C_1$- to $C_{16}$-alkyl)$_3^+$ or pyridinio,
- $R^{240}$, $R^{241}$ and $R^{243}$, independently of one another, are hydrogen, halogen, $C_1$- to $C_{16}$-alkyl or CO—O—$C_1$- to $C_{16}$-alkyl, and
- $R^{240}$ and $R^{241}$ are additionally —CH$_2$—A$^+$ An$^-$,
- v is an integer from 1 to 3, where for v>1, the radicals may have different meanings,
- D is —CH=CH—, thiophen-2,5-diyl, furan-2,5-diyl or p-phenylene,
- Z is O, S or N—$R^{244}$,
- W is N or CH,
- $R^{242}$ is hydrogen, cyano or CO—O—$C_1$- to $C_{16}$-alkyl,
- z is 0 or 1,
- $R^{244}$ and $R^{245}$, independently of one another, are $C_1$- to $C_{16}$-alkyl,
- An$^-$ is an anion,
- Cat$^+$ is Na$^+$, Li$^+$, NH$_4^+$ or N($C_1$- to $C_{12}$-alkyl)$_4^+$,
- E is CH, C—CN or N,
- $R^{246}$ and $R^{247}$, independently of one another, are $C_1$- to $C_{16}$-alkylamino, $C_1$- to $C_{16}$-dialkylamino, anilino, morpholino, piperidino or pyrrolidino, where the alkyl, alkoxy, aryl and heterocyclic radicals may optionally carry further radicals, such as alkyl, halogen, hydroxyalkyl, nitro, cyano, CO—NH$_2$, alkoxy, alkoxycarbonyl, trialkylsilyl, trialkylsiloxy or phenyl, the alkyl and alkoxy radicals may be straight-chain or branched, the alkyl radicals may be partially or perhalogenated, the alkyl and alkoxy radicals may be ethoxylated or propoxylated or silylated, adjacent alkyl and/or alkoxy radicals on aryl or heterocyclic radicals may jointly form a three- or four-membered bridge, and the heterocyclic radicals may be benzo-fused.

8. Optical data carrier according to claim 1, characterized in that the light-absorbent compound is one of the following compounds:

(CCXVIII)

(CCCI)

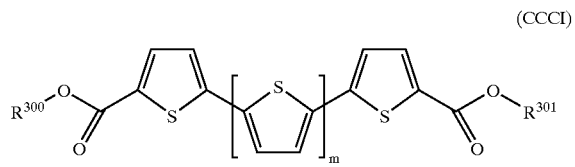

(CCCII)

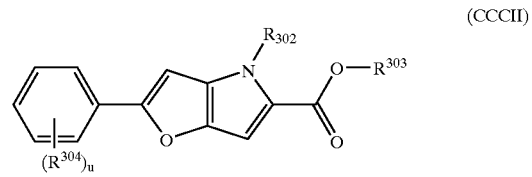

(CCCIII)

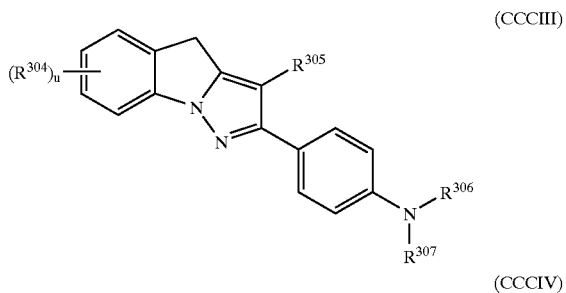

(CCCIV)

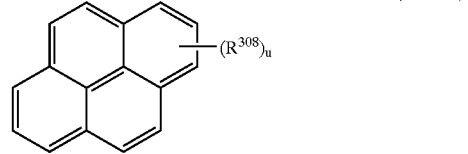

(CCCV)

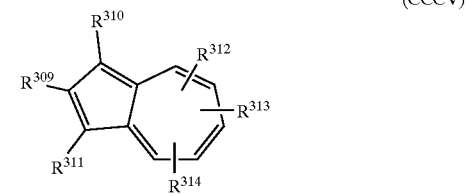

(CCCVI)

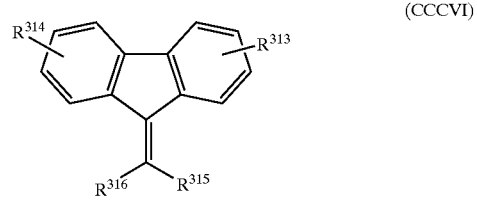

(CCCVII)

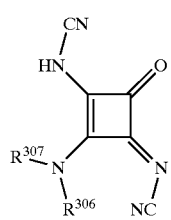

-continued (CCCVIII)
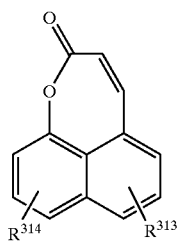

(CCCIX)
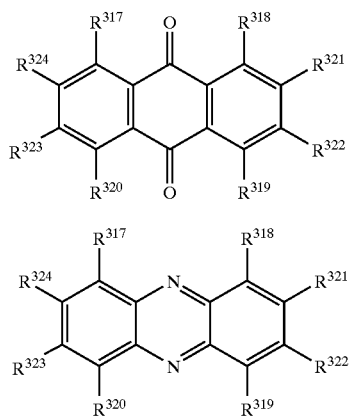

(CCCX)

(CCCXI)
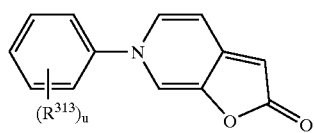

(CCCXII)
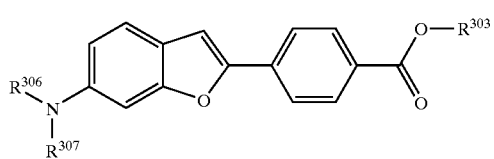

(CCCXIII)
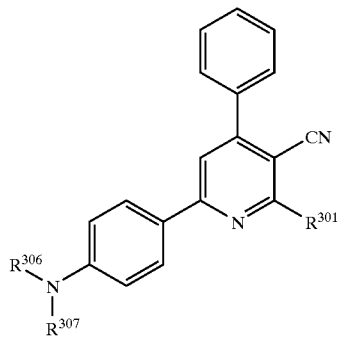

(CCCXIV)
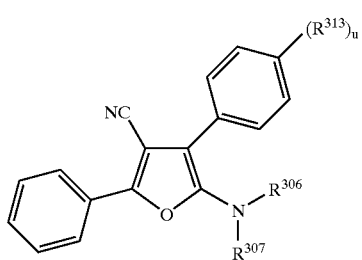

-continued (CCCXV)
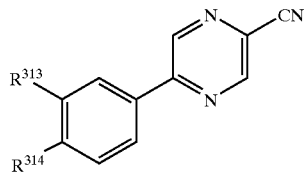

in which $R^{300}$, $R^{301}$ and $R^{303}$, independently of one another, are hydrogen or $C_1$- to $C_{16}$-alkyl, m is an integer from 0 to 10, u is an integer from 1 to 3, where for u>1, the radicals may be different, $R^{302}$ is hydrogen, $C_1$- to $C_{16}$-alkoxycarbonyl or $C_1$- to $C_{16}$-alkyl, $R^{304}$ is hydrogen, halogen, cyano, nitro, $C_1$- to $C_{16}$-alkoxy, di-$C_1$-$C_6$-alkylamines, $C_1$- to $C_{16}$-alkoxycarbonyl or $C_1$- to $C_{16}$-alkyl, $R^{305}$ is hydrogen, $C_1$- to $C_{16}$-alkoxy, $C_1$- to $C_{16}$-alkoxycarbonyl or $C_1$- to $C_{16}$-alkyl, $R^{306}$ and $R^{307}$, independently of one another, are hydrogen, $C_1$- to $C_{16}$-alkyl or $C_6$- to $C_{10}$-aryl, or $NR^{306}R^{307}$ is morpholino, piperidino or pyrrolidino, $R^{308}$ is $C_1$- to $C_{16}$-alkoxycarbonyl, carboxyl, $C_1$- to $C_{16}$-alkyl, $C_1$- to $C_{16}$-alkoxy, $C_1$- to $C_{16}$-alkylaminocarbonyl or $C_1$- to $C_{16}$-dialkylaminocarbonyl, $R^{309}$ to $R^{314}$, independently of one another, are hydrogen, $C_6$- to $C_{10}$-aryl, carboxyl, cyano, $C_1$- to $C_{16}$-alkoxycarbonyl, $C_1$- to $C_{16}$-alkoxy or $C_1$- to $C_{16}$-alkyl, $R^{315}$ and $R^{316}$, independently of one another, are carboxyl, $C_1$- to $C_{16}$-alkoxycarbonyl, $C_1$- to $C_{16}$-alkoxy or cyano, or $R^{315}$ and $R^{316}$, together with the carbon atom connecting them, form a 5- or 6-membered carbocyclic or heterocyclic ring, $R^{317}$ to $R^{324}$, independently of one another, are $C_1$- to $C_{16}$-alkyl, hydrogen, hydroxyl, carboxyl, $C_1$- to $C_{16}$-alkoxycarbonyl, $C_1$- to $C_{16}$-alkoxy, $C_6$- to $C_{10}$-aryloxy or cyano, where the alkyl, alkoxy, aryl and heterocyclic radicals may optionally carry further radicals, such as alkyl, halogen, hydroxyalkyl, nitro, cyano, CO—NH$_2$, alkoxy, alkoxycarbonyl, trialkylsilyl, trialkylsiloxy or phenyl, the alkyl and alkoxy radicals may be straight-chain or branched, the alkyl radicals may be partially or perhalogenated, the alkyl and alkoxy radicals may be ethoxylated or propoxylated or silylated, adjacent alkyl and/or alkoxy radicals on aryl or heterocyclic radicals may jointly form a three- or four-membered bridge, and the heterocyclic radicals may be benzo-fused.

9. Optical data carrier according to claim 1, characterized in that the light-absorbent compound is one of the following compounds:

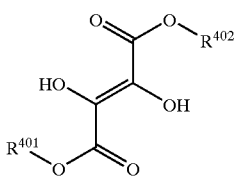 (CDI)
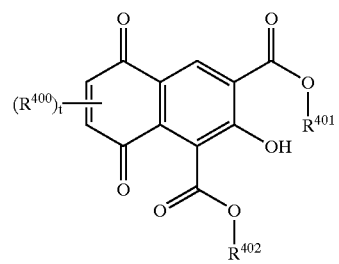 (CDII)
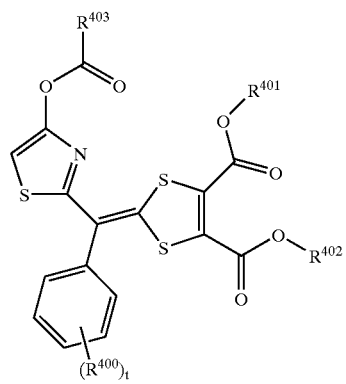 (CDIII)
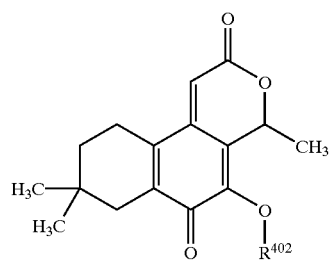 (CDIV)
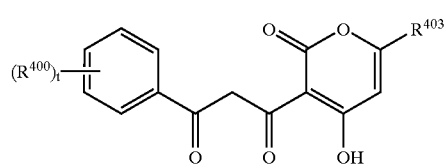 (CDV)
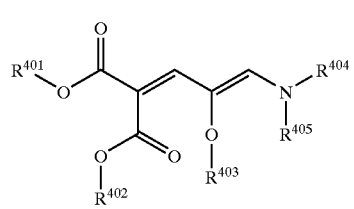 (CDVI)
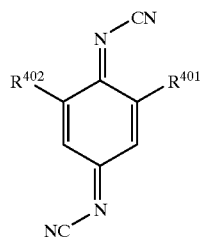 (CDVII)
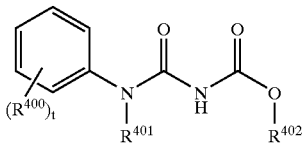 (CDVIII)
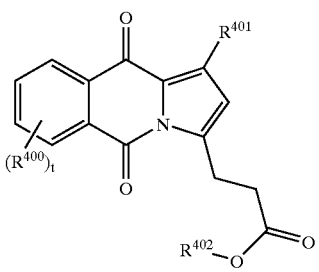 (CDIX)
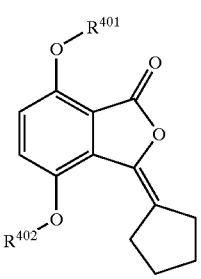 (CDX)
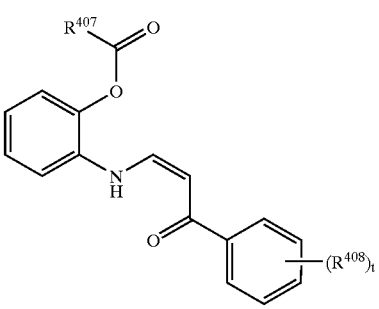 (CDXI)
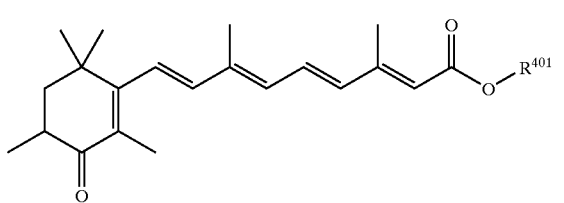 (CDXII)

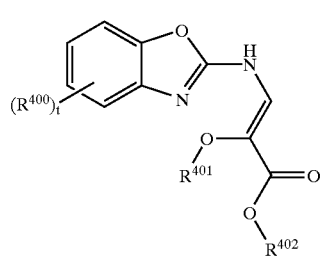
(CDXIII)

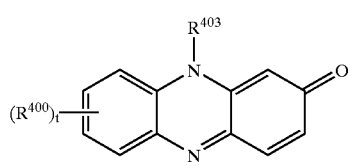
(CDXIV)

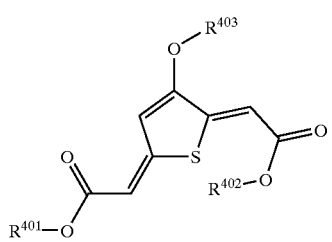
(CDXV)

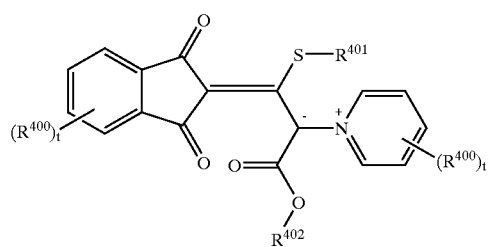
(CDXVI)

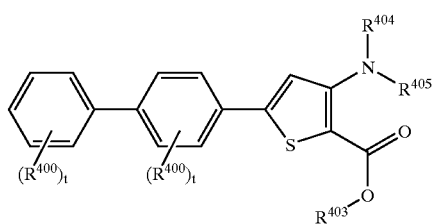
(CDXVII)

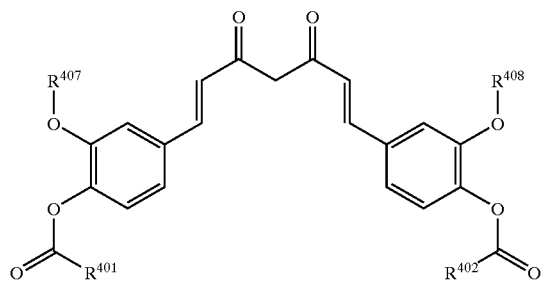
(CDXVIII)

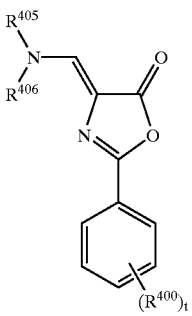
(CDXIX)

in which $R^{400}$ is hydrogen, $C_1$- to $C_{12}$-alkyl or $C_1$- to $C_{12}$-alkoxy, t is an integer from 1 to 3, where for t>1, the radicals may be different, $R^{401}$ and $R^{402}$, independently of one another, are hydrogen or $C_1$- to $C_{16}$-alkyl, $R^{403}$ is hydrogen, $C_6$- to $C_{10}$-aryl or $C_1$- to $C_{16}$-alkyl, $R^{404}$ and $R^{405}$, independently of one another, are $C_1$- to $C_{16}$-alkyl, $C_6$- to $C_{10}$-aryl or $NR^{404}R^{405}$ is morpholino, piperidino or pyrrolidino, $R^{406}$ is hydrogen, cyano, nitro, carboxyl, $C_1$- to $C_{16}$-alkyl, $C_1$- to $C_{16}$-alkoxy or $C_1$- to $C_{16}$-alkoxycarbonyl, $R^{407}$ and $R^{408}$, independently of one another, are hydrogen or $C_1$- to $C_{16}$-alkyl, where the alkyl, alkoxy, aryl and heterocyclic radicals may optionally carry further radicals, such as alkyl, halogen, hydroxyalkyl, nitro, cyano, CO—NH$_2$, alkoxy, alkoxycarbonyl, or phenyl, the alkyl and alkoxy radicals may be straight-chain or branched, the alkyl radicals may be partially or perhalogenated, the alkyl and alkoxy radicals may be ethoxylated or propoxylated or silylated, adjacent alkyl and/or alkoxy radicals on aryl or heterocyclic radicals may jointly form a three- or four-membered bridge, and the heterocyclic radicals may be benzo-fused.

10. Use of light-absorbent compounds in the information layer of write-once optical data carriers, where the light-absorbent compounds have an absorption maximum $\lambda_{max1}$ of from 340 to 410 nm and the wavelength $\lambda_{1/2}$, at which the absorbance on the long-wave edge of the absorption maximum of the wavelength $\lambda_{max1}$ is half the absorbance value at $\lambda_{max1}$, and the wavelength $\lambda_{1/10}$, at which the absorbance on the long-wave edge of the absorption maximum of wavelength $\lambda_{max1}$ is a tenth of the absorbance value at $\lambda_{max1}$, i.e. $\lambda_{1/2}$ and $\lambda_{1/10}$ both jointly lie in the wavelength range from 370 to 460 nm.

11. Process for the production of an optical data carrier according to claim 1, which is characterized in that a preferably transparent substrate, which has optionally already been coated with a reflection layer, is coated with the light-absorbent compounds, if desired in combination with suitable binders and additives and, if desired, suitable solvents, and is, if desired, provided with a reflection layer, further interlayers and, if desired, a protective layer or a further substrate or a cover layer.

* * * * *